(12) United States Patent
Xie et al.

(10) Patent No.: US 9,064,186 B2
(45) Date of Patent: Jun. 23, 2015

(54) LIMITED-CONTEXT-BASED IDENTIFYING KEY FRAME FROM VIDEO SEQUENCE

(75) Inventors: Xiaohui Xie, Beijing (CN); Xiao Zeng, Beijing (CN); Yingfei Liu, Beijing (CN); Yanming Zou, Beijing (CN); Kongqiao Wang, Beijing (CN); Zhicheng Zhao, Beijing (CN); Anni Cai, Beijing (CN)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 13/991,721

(22) PCT Filed: Dec. 9, 2010

(86) PCT No.: PCT/CN2010/079601
§ 371 (c)(1),
(2), (4) Date: Jun. 5, 2013

(87) PCT Pub. No.: WO2012/075634
PCT Pub. Date: Jun. 14, 2012

(65) Prior Publication Data
US 2013/0251274 A1 Sep. 26, 2013

(51) Int. Cl.
*G06K 9/68* (2006.01)
*G06K 9/62* (2006.01)
*G06K 9/00* (2006.01)

(52) U.S. Cl.
CPC .......... *G06K 9/6202* (2013.01); *G06K 9/00751* (2013.01)

(58) Field of Classification Search
CPC .................................................. G06K 9/4609
See application file for complete search history.

(56) References Cited

U.S. PATENT DOCUMENTS

| | | |
|---|---|---|
| 6,334,022 B1 | 12/2001 | Ohba et al. |
| 6,473,095 B1 | 10/2002 | Martino et al. |
| 6,473,529 B1 | 10/2002 | Lin |
| 7,418,192 B2 | 8/2008 | Gutta et al. |
| 7,483,618 B1 | 1/2009 | Edwards et al. |

(Continued)

FOREIGN PATENT DOCUMENTS

| | | |
|---|---|---|
| CN | 101719144 | 6/2010 |
| WO | 2012/037715 A1 | 3/2012 |

OTHER PUBLICATIONS

Ferman et al., "Robust Color Histogram Descriptors for Video Segment Retrieval and Identification", IEEE Transactions on Image Processing, vol. 11, Issue 5, May 2002, pp. 1-12.

(Continued)

*Primary Examiner* — Stephen R Koziol
*Assistant Examiner* — Amandeep Saini
(74) *Attorney, Agent, or Firm* — Alston & Bird LLP

(57) ABSTRACT

An example apparatus is caused to receive a video sequence of a plurality of frames, and perform a number of operations as each of at least some of the frames is received but before all of the frames are received. The apparatus is caused to calculate a score for the frame, and compare the score for the frame to a predefined threshold. The apparatus is caused to cause output of the frame as a key frame in an instance in which the frame is received within a specified period of time and the score for the frame is above the predefined threshold. Otherwise, in an instance in which none of the scores for frames received within the specified period of time is above the predefined threshold, the apparatus is caused to cause output of one of the frames received within the specified period of time as a key frame.

18 Claims, 16 Drawing Sheets

(56) References Cited

U.S. PATENT DOCUMENTS

| | | | |
|---|---|---|---|
| 7,558,760 | B2 | 7/2009 | Fang et al. |
| 7,643,657 | B2 | 1/2010 | Dufaux et al. |
| 7,694,320 | B1 | 4/2010 | Yeo et al. |
| 7,711,578 | B2 | 5/2010 | Williams et al. |
| 2006/0228029 | A1 | 10/2006 | Zhang et al. |
| 2007/0182861 | A1 | 8/2007 | Luo et al. |
| 2010/0306193 | A1* | 12/2010 | Pereira et al. .......... 707/728 |
| 2012/0120251 | A1* | 5/2012 | Sun et al. .......... 348/180 |

OTHER PUBLICATIONS

Sze et al., "A New Key Frame Representation for Video Segment Retrieval", IEEE Transactions on Circuits and Systems for Video Technology, vol. 15, Issue 9, Sep. 2005, pp. 1148-1155.

Liu et al., "Key Frame Extraction from MPEG Video Stream", Proceedings of the Second Symposium International Computer Science and Computational Technology, Dec. 26-28, 2009, pp. 7-11.

Calic et al., "Optimising Video Summaries for Mobile Devices Using Visual Attention Modelling", Proceedings of the 2nd international conference on Mobile multimedia communications, Oct. 2006, 5 pages.

You et al., "A Multiple Visual Models Based Perceptive Analysis Framework for Multilevel Video Summarization", IEEE Transactions on Circuits and Systems for Video Technology, vol. 17, Issue 3, Mar. 2007, pp. 273-285.

Gatica-Perez et al., "Finding Structure in Home Videos by Probabilistic Hierarchical Clustering", IEEE Transactions on Circuits and Systems for Video Technology, vol. 13, Issue 6, Jun. 2003, pp. 539-548.

Office action received for corresponding Korean Patent Application No. 2013-7017856, dated Jun. 12, 2014, 5 pages of Office Action, No English Language Translation available.

International Search Report received for corresponding Patent Cooperation Treaty Application No. PCT/CN2010/079601, dated Sep. 8, 2011, 3 pages.

Sun et al., "Video Key Frame Extraction Based on Spatial-Temporal Color Distribution", International Conference on Intelligent Information Hiding and Multimedia Signal Processing, Aug. 15-17, 2008, pp. 196-199.

Zhao et al., "Extraction of Semantic Keyframes Based on Visual Attention and Affective Models", International Conference on Computational Intelligence and Security, Dec. 15-19, 2007, pp. 371-375.

Luo et al., "Towards Extracting Semantically Meaningful Key Frames From Personal Video Clips: From Humans to Computers", IEEE Transactions on Circuits and Systems for Video Technology, vol. 19, Issue 2, Feb. 2009, pp. 289-301.

Sugano et al., "Genre classification method for home videos", IEEE International Workshop on Multimedia Signal Processing, Oct. 5-7, 2009, pp. 1-5.

Office action received for corresponding Russian Federation Application No. 2013131158, dated Oct. 23, 2014, 6 pages of Office Action, No English Language Translation available.

Office Action for Korean Application No. 2013-7017856 dated Dec. 20, 2014.

Chua, T. et al., *A Video Retrieval and Sequencing System*, ACM Transaction of Information Systems, 13(4), (Oct. 1995), 1-44.

Girgensohn, A. et al., *Time-Constrained Keyframe Selection Technique*, IEEE International Conference on Multimedia Computing and Systems (1999) 756-761.

Takahashi, Y. et al., *User and Device Adaptations for Sports Video Content*, ICME (2007) 1051-1054.

Tseng, B. et al., *Video Personalization and Summarization System*, IEEE Workshop on Multimedia Signal Processing, (2002) 424-427.

Vetro, A., *Providing Multimedia Services to a Diverse Set of Consumer Devices*, ICCE (2001) 32-33.

Yeung, M. et al., *Efficient Matching and Clustering of Video Shots*, Proceedings of the International Conference on Image Processing (1995) 338-341.

Yueting, Z. et al., *Adaptive key Frame Extraction Using Unsupervised Clustering*, IEEE International Conference on Imaging Processing (1998) 866-870.

International Written Opinion from International Application No. PCT/CN2010/079601, dated Sep. 8, 2011.

* cited by examiner

| MEAN = 55 RANK = 4 | MEAN = 12 RANK = 1 | MEAN = 24 RANK = 2 |
|---|---|---|
| MEAN = 214 RANK = 6 | MEAN = 50 RANK = 3 | MEAN = 120 RANK = 5 |

ORDER SEQUENCE:
412635412635

LONGEST COMMON SEQ:
41261 (OR 26526, ...)

| MEAN = 80 RANK = 5 | MEAN = 30 RANK = 3 | MEAN = 22 RANK = 2 |
|---|---|---|
| MEAN = 51 RANK = 4 | MEAN = 255 RANK = 6 | MEAN = 11 RANK = 1 |

ORDER SEQUENCE:
532461532461

KEY FRAME $k_{l-n}$    KEY FRAME $k_m$    KEY FRAME $k_l$

GROUP

LIMITED-CONTEXT-BASED IDENTIFYING KEY FRAME FROM VIDEO SEQUENCE

RELATED APPLICATION

This application was originally filed as PCT Application No. PCT/CN2010/079601 filed Dec. 9, 2010.

TECHNICAL FIELD

The present invention generally relates to browsing video sequences and, more particularly, relates to identifying a key frame from a video sequence to facilitate browsing of video sequences based on their respective key frames.

BACKGROUND

As mobile data storage increases and camera-imaging quality improves, users are increasingly capturing and sharing video with their mobile devices. One major drawback of the increasing use of video, however, arises while browsing a graphical user interface for a desired video clip or sequence. Video summarization is a family of techniques for creating a summary of a video sequence including one or more scenes each of which includes one or more frames. The summary may take any of a number of different forms, and in various instances, may include cutting a video sequence at the scene level or frame level. In the context of cutting a video at the scene level, a video summary may be presented, for example, as a video skim including some scenes but cutting other scenes. In the context of cutting a video at the frame level, a video summary may be presented, for example, as a fast-forward function of key frames of the video sequence, or as a still or animated storyboard of one or more key frames or thumbnails of one or more key frames. A summary of a video sequence may facilitate a user identifying a desired video sequence from among a number of similar summaries of other video sequences. Further, a summary may facilitate more efficient memory recall of a video sequence since the user may more readily identify a desired video.

Although a number of video summarization techniques have been developed, it is generally desirable to improve upon existing techniques.

BRIEF SUMMARY

In light of the foregoing background, example embodiments of the present invention provide an improved apparatus, method and computer-readable storage medium for identifying one or more key frames of a video sequence including a plurality of frames. One aspect of example embodiments of the present invention is directed to an apparatus including at least one processor and at least one memory including computer program code. The memory/memories and computer program code are configured to, with processor(s), cause the apparatus to at least perform a number of operations.

The apparatus is caused to receive a video sequence of a plurality of frames, and perform a number of operations as each of at least some of the frames is received but before all of the frames are received. In this regard, the apparatus is caused to calculate a score for the frame as a function of a value of each of one or more properties of a picture of the frame. These properties may include, for example, one or more of a luminance, edge point detection, grayscale entropy or color entropy of a picture of the frame. The apparatus is caused to compare the score for the frame to a predefined threshold, and cause output of the frame as a key frame in an instance in which the frame is received within a specified period of time and the score for the frame is above the predefined threshold. Otherwise, in an instance in which none of the scores for frames received within the specified period of time is above the predefined threshold, the apparatus is caused to cause output of one of the frames received within the specified period of time as a key frame. In this instance, the frame output as the key frame is the frame having the highest score among the frames received within the specified period of time.

As each of at least some of the frames is received after output of the key frame, the apparatus may be further caused to calculate the score for the frame, and compare a weighted score for the frame to the score for the key frame, where the weighted score includes the score for the frame weighted by a weight coefficient. The apparatus may then be caused to cause updating of the key frame with the frame in an instance in which weighted score for the frame is greater than the score for the key frame.

Additionally or alternatively, the apparatus may be caused to receive user input to select a received frame of the video sequence as a key frame, where the user input is received before all of the frames of the video sequence are received. In response to receipt of the user input, the apparatus may be caused to cause output of one of the received frames as a key frame. For example, the apparatus may be caused to cause output of one of the received frames having a highest score among a plurality of the received frames.

In various instances, the video sequence may include a long segment and/or a plurality of segments, each of which includes a plurality of frames. In such instances, the apparatus may be caused to perform various operations including causing output of a frame as a key frame in a plurality of instances for the long segment, or for each of at least some of the segments of the video sequence. Also in such instances, as at least some but before all of the frames of the video sequence are received, the apparatus may be further caused to detect at least some of the segments.

The apparatus being caused to detect at least some of the segments may include being caused to calculate an inter-frame difference between pictures of one or more successive pairs of frames, and identify a pair of frames as a boundary between segments to thereby detect an end of one segment and a beginning of a next segment in an instance in which the inter-frame difference is above a second threshold (e.g., $T_d$). In this regard, the inter-frame difference may be calculated as a function of values of each of one or more second properties of the pictures of the respective frames.

In a more particular example, the apparatus being caused to identify a pair of frames as a boundary between segments may include being caused to identify a pair of frames as a potential boundary between segments in an instance in which the inter-frame difference is above the second threshold. The apparatus may then be caused to calculate motion information for at least one of the identified pair of frames or one or more successive pairs of frames after the identified pair of frames. And the apparatus may be caused to identify the pair of frames as an actual boundary between segments in an instance in which the pair of frames satisfy one or more conditions, at least one of which is a function of the motion information.

The apparatus may be further caused to group at least one plurality of frames output as key frames based on an identification of at least two of the frames in each plurality being similar. In such instances, the respective frames may be identified as being similar based on values of one or more third properties of pictures of the respective frames. The third properties may include, for example, one or more of a block histogram, color histogram or order sequence.

BRIEF DESCRIPTION OF THE DRAWINGS

Figure 1:
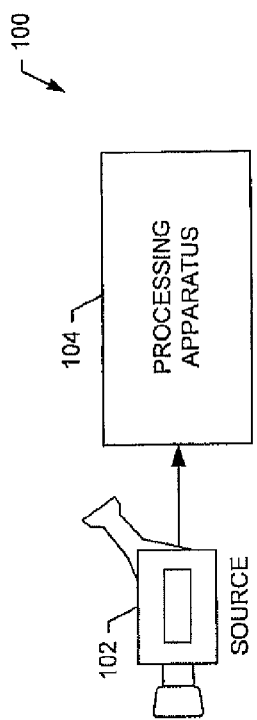
Figure 2:
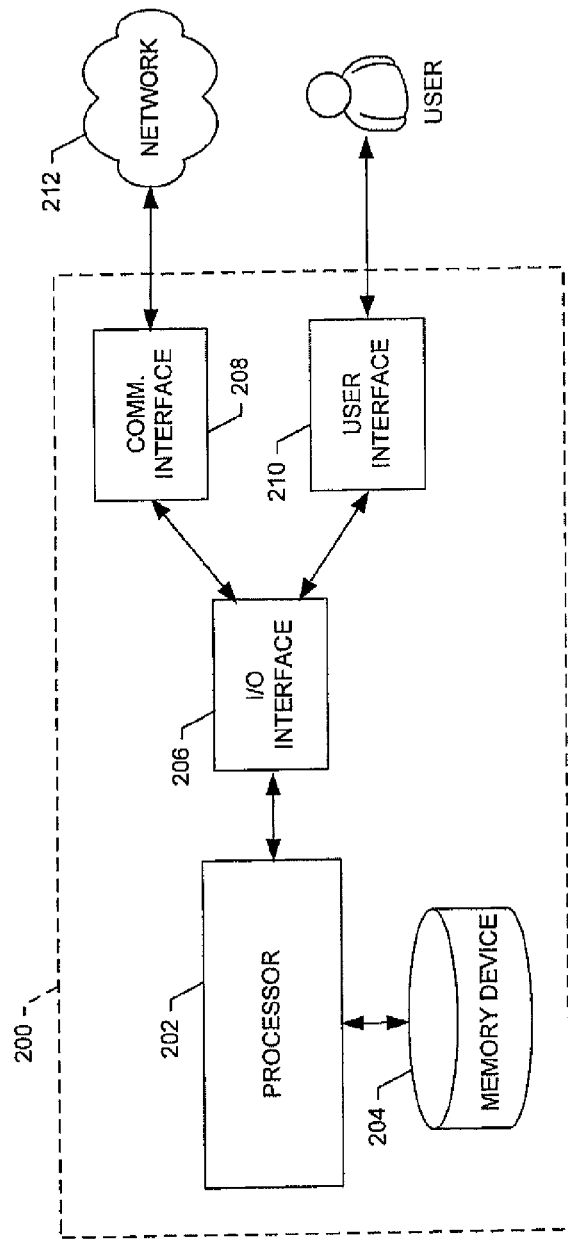
Figure 3:
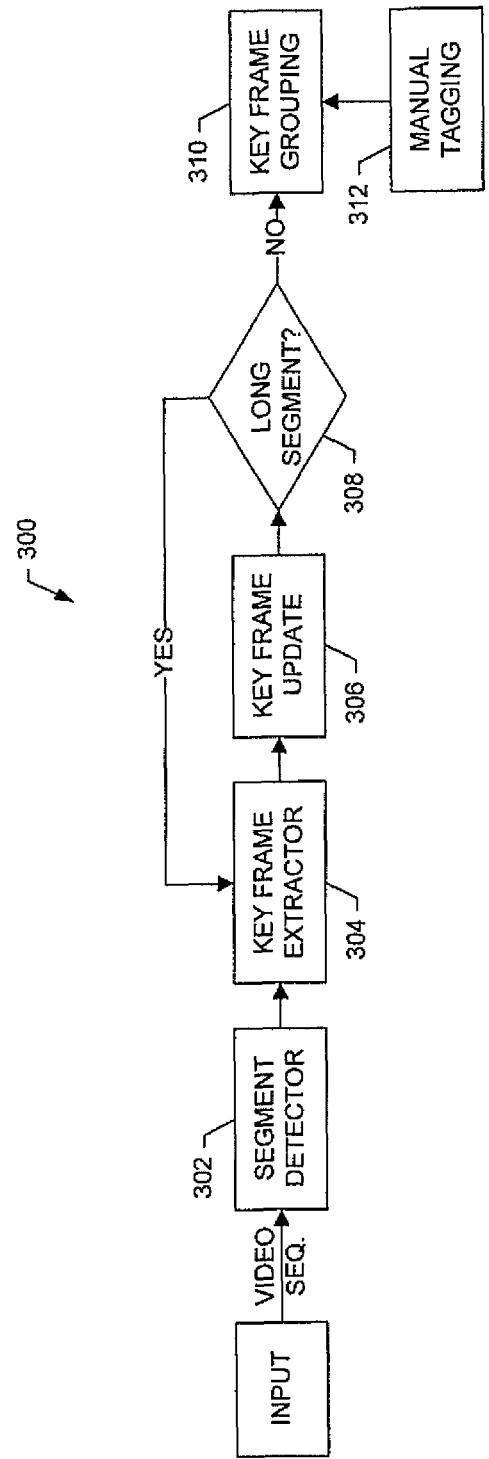
Figure 7:
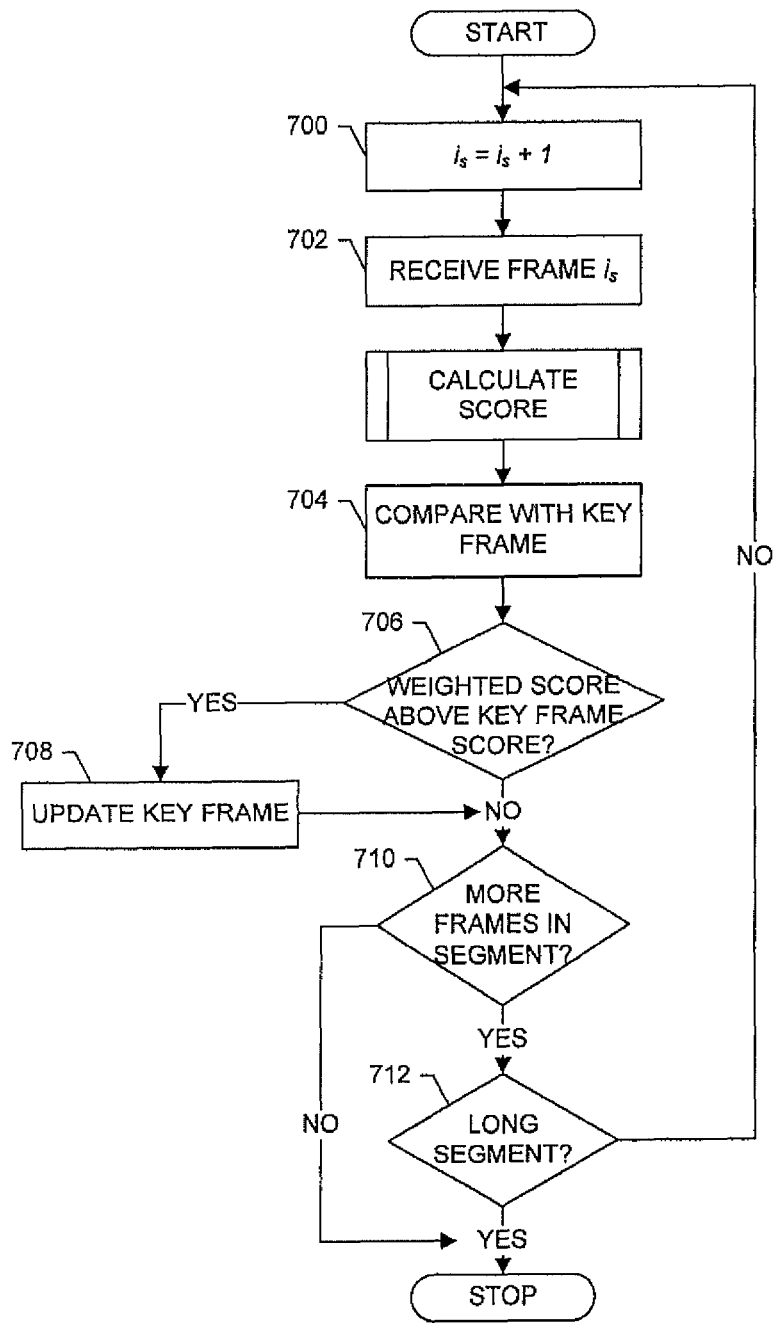
Figures 9, 10:
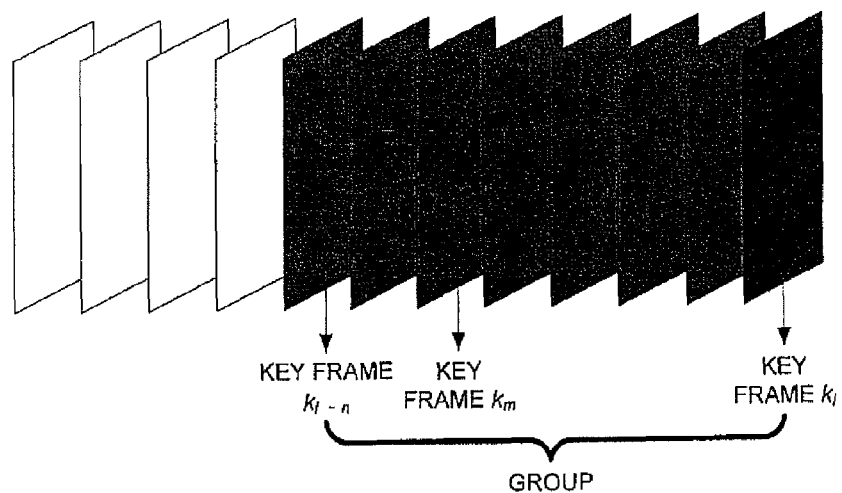

Having thus described the invention in general terms, reference will now be made to the accompanying drawings, which are not necessarily drawn to scale, and wherein:

FIG. 1 is a block diagram of a system, in accordance with example embodiments of the present invention;

FIG. 2 is a schematic block diagram of the apparatus of the system of FIG. 1, in accordance with example embodiments of the present invention;

FIG. 3 is a functional block diagram of the apparatus of FIG. 2, in accordance with example embodiments of the present invention;

FIG. 4 illustrates flowcharts of various operations in a method of detecting a segment of a video sequence, according to example embodiments of the present invention;

FIG. 5 illustrates a diamond search method according to example embodiments of the present invention;

FIG. 6 illustrates flowcharts of various operations in a method of identifying one or more key frames from a segment of a video sequence, according to example embodiments of the present invention;

FIG. 7 is a flowchart illustrating various operations in a method of updating a key frame of a segment of a video sequence, according to example embodiments of the present invention;

FIG. 8 illustrates flowcharts of various operations in a method of grouping key frames of a video sequence, according to example embodiments of the present invention;

FIG. 9 illustrates an example of calculating an order sequence and longest common subsequence (LCS) of a number of sequences, according to example embodiments of the present invention;

FIG. 10 illustrates an example of grouping key frames according to example embodiments of the present invention;

FIG. 11 illustrates flowcharts of various operations in a method of receiving selection of and outputting a selected frame as a key frame of a segment of a video sequence, according to example embodiments of the present invention; and FIGS. 12-15 are example displays that may be presented by an apparatus in accordance with example embodiments of the present invention

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data," "content," "information," and similar terms may be used interchangeably, according to some example embodiments of the present invention, to refer to data capable of being transmitted, received, operated on, and/ or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/ or firmware), such as (as applicable): (i) a combination of processor(s) or (ii) portions of processor(s)/software (including digital signal processor(s)), software and memory/memories that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Further, as described herein, various messages or other communication may be transmitted or otherwise sent from one component or apparatus to another component or apparatus. It should be understood that transmitting a message or other communication may include not only transmission of the message or other communication, but may also include preparation of the message or other communication by a transmitting apparatus or various means of the transmitting apparatus.

Referring to FIG. 1, an illustration of one system that may benefit from the present invention is provided. The system, method and computer program product of exemplary embodiments of the present invention will be primarily described without respect to the environment within which the system, method and computer program product operate. It should be understood, however, that the system, method and computer program product may operate in a number of different environments, including mobile and/or fixed environments, wireline and/or wireless environments, standalone and/or networked environments or the like. For example, the system, method and computer program product of exemplary embodiments of the present invention can operate in mobile communication environments whereby mobile terminals operating within one or more mobile networks include or are otherwise in communication with one or more sources of video sequences.

The system 100 includes a video source 102 and a processing apparatus 104. Although shown as separate components, it should be understood that in some embodiments, a single apparatus may support both the video source and processing apparatus, logically separated but co-located within the respective entity. For example, a mobile terminal may support a logically separate, but co-located, video source and processing apparatus. Irrespective of the manner of implementing the system, however, the video source can comprise any of a number of different components capable of providing one or more sequences of video. Like the video source, the processing apparatus can comprise any of a number of different components configured to process video sequences from the video source according to example embodiments of the present invention. Each sequence of video provided by the video source may include a plurality of frames, each of which may include an image, picture, slice or the like (generally referred to as "picture") of a shot or scene (generally referred to as a "scene") that may or may not depict one or more objects. The sequence may include different types of frames, such as intra-coded frames (I-frames) that may be interspersed with inter-coded frames such as predicted picture frames (P-frames) and/or bi-predictive picture frames (B-frames).

The video source 102 can include, for example, an image capture device (e.g., video camera), a video cassette recorder (VCR), digital versatile disc (DVD) player, a video file stored in memory or downloaded from a network, or the like. In this regard, the video source can be configured to provide one or more video sequences in a number of different formats including, for example, Third Generation Platform (3GP), AVI (Audio Video Interleave), Windows Media®, MPEG (Moving Pictures Expert Group), QuickTime®, RealVideo®, Shockwave® (Flash®) or the like.

Reference is now made to FIG. 2, which illustrates an apparatus 200 that may be configured to function as the processing apparatus 104 to perform example methods of the present invention. In some example embodiments, the apparatus may, be embodied as, or included as a component of, a communications device with wired or wireless communications capabilities. The example apparatus may include or otherwise be in communication with one or more processors 202, memory devices 204, Input/Output (I/O) interfaces 206, communications interfaces 208 and/or user interfaces 210 (one of each being shown).

The processor 202 may be embodied as various means for implementing the various functionalities of example embodiments of the present invention including, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package. Examples of a multi-core processor include two, four, eight, or greater numbers of processing cores. Further, the processor may be comprised of a plurality of transistors, logic gates, a clock (e.g., oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be configured to operate such that the processor causes the apparatus to perform various functionalities described herein.

Whether configured as hardware alone or via instructions stored on a computer-readable storage medium, or by a combination thereof, the processor 202 may be an apparatus configured to perform operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 204 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 202.

Further, the memory device 204 may be configured to store information, data, applications, computer-readable program code instructions, and/or the like for enabling the processor 202 and the example apparatus 200 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 206 may be any device, circuitry, or means embodied in hardware, software or a combination of hardware and software that is configured to interface the processor 202 with other circuitry or devices, such as the communications interface 208 and/or the user interface 210. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 200 to perform, various functionalities of an example embodiment of the present invention.

The communication interface 208 may be any device or means embodied in hardware, software or a combination of hardware and software that is configured to receive and/or transmit data from/to one or more networks 212 and/or any other device or module in communication with the example apparatus 200. The processor 202 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 208 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of second generation (2G), third generation (3G), fourth generation (4G) or higher generation mobile communication technologies, radio frequency (RF), infrared data association (IrDA) or any of a number of different wireless networking techniques. The communications interface may also be configured to support communications at the network layer, possibly via Internet Protocol (IP).

The user interface 210 may be in communication with the processor 202 to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device 204). In some example embodiments, the user interface circuitry is configured to facilitate user control of at least some functions of the apparatus 200 through the use of a display and configured to respond to user inputs. The processor may also comprise, or be in communication with, display circuitry configured to display at least a portion of a user interface, the display and the display circuitry configured to facilitate user control of at least some functions of the apparatus.

In some cases, the apparatus 200 of example embodiments may be implemented on a chip or chip set. In an example embodiment, the chip or chip set may be programmed to perform one or more operations of one or more methods as described herein and may include, for instance, one or more processors 202, memory devices 204, I/O interfaces 206 and/or other circuitry components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip or chip set can be implemented in a single chip. It is further contemplated that in certain embodiments the chip or chip set can be implemented as a single "system on a chip." It is further contemplated that in certain embodiments a separate ASIC may not be used, for example, and that all relevant operations as disclosed herein may be performed by a processor or processors. A chip or chip set, or a portion thereof, may constitute a means for performing one or more operations of one or more methods as described herein.

In one example embodiment, the chip or chip set includes a communication mechanism, such as a bus, for passing information among the components of the chip or chip set. In accordance with one example embodiment, the processor 202 has connectivity to the bus to execute instructions and process information stored in, for example, the memory device 204. In instances in which the apparatus 200 includes multiple processors, the processors may be configured to operate in tandem via the bus to enable independent execution of instructions, pipelining, and multithreading. In one example embodiment, the chip or chip set includes merely one or more processors and software and/or firmware supporting and/or relating to and/or for the one or more processors.

As explained in the background section, video summarization is a family of techniques for creating a summary of a video sequence including one or more scenes each of which includes one or more frames. Example embodiments of the present invention provide a technique for identifying one or more key frames of a plurality of frames of a video sequence during receipt of the video sequence. Example embodiments of the present invention also permit a user to manually select one or more frames of the video sequence as key frames. These key frame(s) may then be used in a number of different manners to provide a user with a flexible manipulation to the video sequence, such as for fast browsing, tagging, summarization or the like.

Reference is now made to FIG. 3, which illustrates a functional block diagram of an apparatus 300 that may be configured to function as the processing apparatus 104 to perform example methods of the present invention. Generally, and as explained in greater detail below, the apparatus may be configured to receive a video sequence, such as in the form of a video media file or live video stream. The apparatus may be configured to analyze the video sequence to identify one or more key frames of the video sequence, and output the identified key frame(s).

The apparatus 300 may include a number of modules, including a segment detector 302, key frame extractor 304, key frame update module 306, long segment determination module 308, key frame grouping module 310 and/or manual tagging module 312, each of which may be implemented by various means. These means may include, for example, the processor 202, memory device 204, I/O interface 206, communication interface 208 (e.g., transmitter, antenna, etc.) and/or user interface 210, alone or under direction of one or more computer program code instructions, program instructions or executable computer-readable program code instructions from a computer-readable storage medium (e.g., memory device).

As explained in greater detail below, the segment detector 302 is configured to detect or otherwise identify one or more segments of a video sequence. Each segment includes a distinct subset of one or more frames of the video sequence, and may be representative of a scene or part of a scene of the video sequence. In accordance with example embodiments of the present invention, the segment detector may implement a limited-context-based technique whereby the segment detector may analyze and identify a segment of the video sequence as the processing apparatus 104 receives the video sequence from the source 102 or otherwise without requiring use of the entire video sequence. That is, as the processing apparatus receives a frame of a video sequence, the segment detector may be configured to analyze the frame in real-time with one or more previous frames (or information from one or more previous frames), and without requiring any subsequent frames in the sequence. And based on this analysis, the segment detector may be configured to identify the boundary between two segments or otherwise identify the beginning of a segment.

The key frame extractor 304 may be configured analyze the frames of each segment detected by the segment detector 302, and based on the analysis, identify one or more key frames of each segment. Just as the segment detector may implement a limited-context-based technique, the technique implemented by the key frame extractor may also be limited-context based. That is, the key frame extractor may be configured to analyze the frames and identify key frame(s) of a segment of a video sequence as the processing apparatus 104 receives the video sequence from the source 102 or otherwise without requiring use of the entire video sequence. The key frame extractor may be further configured to identify a key frame within a specified time period (e.g., two seconds), and direct display of the identified key frame of each segment on a user interface.

As the key frame extractor 304 may identify a key frame of a segment with limited context and within a specified time frame, it may be the case that another, subsequent frame of the segment is more representative of the segment. Thus, even after identifying a key frame of a segment, the key frame extractor 304 may be configured to continue analyzing subsequent frame(s) of the segment. In various instances, the key frame update module 306 may be configured to update a key frame of a segment with another frame of the segment. That is, the key frame update module may be configured to compare the analysis of the subsequent frame(s) with the analysis of the identified key frame, and in various instances, replace the identified key frame with one of the subsequent frame(s). The key frame update module may then direct display of the updated key frame on the user interface, such as by replacing the former identified key frame with the updated key frame on the user interface. The key frame extractor and key frame update module may continue their respective operations for a segment even after updating the key frame, and thus, the key frame update module may update a key frame of a segment at one or more instances after being identified by the key frame extractor.

In various instances, a segment of a video sequence may include a significant plurality of frames, which may be representative of a lengthy scene. The long segment determination module 308 may therefore be configured to identify a long segment such as a segment including a number of frames above a threshold number of frames, and direct the key frame extractor 304 (and hence key frame update module 306) to identify (and, if appropriate, update) an additional key frame of the segment. The long segment determination module may be configured to direct identification of an additional key frame once, or for each sequential subset of the threshold number of frames of the segment. Thus, for example, the long segment determination module may be configured to direct identification of one additional key frame of a segment including greater than 20 frames, or may direct identification of an additional key frame of each sequential subset of 20 frames of the segment.

As indicated above, a segment of a video sequence may be representative of a part of a scene of the video sequence. In such instances, the scene of the video sequence may be made up of multiple, semantically-related segments. Consider, for example, a scene of a video sequence in which two speakers are exchanging dialog, and in which the video sequence includes multiple shorter shots switching between the speakers. In these instances, each shot may focus on one of the speakers, and may be detected by the segment detector 302 as a separate segment. The key frame grouping module 310 may therefore be configured to identify any plurality of segments representative of a common scene, and group the key frame(s) of the respective segments. The key frame grouping module may be configured to add key frame(s) of subsequent segment(s) to a group in instances in which the subsequent segment(s) are semantically-related to the segments of the key frames of the group, or may start a new group for the key frame(s) when the subsequent segment(s) are not semantically-related to the respective segments.

The manual tagging module 312 may be configured to receive user selection of a frame of a segment of the video sequence, and set the selected frame as a key frame of the segment. This manually-set key frame may be set as an additional key frame of the segment, or in various instances, may replace another key frame of the segment.

Figure 4A:
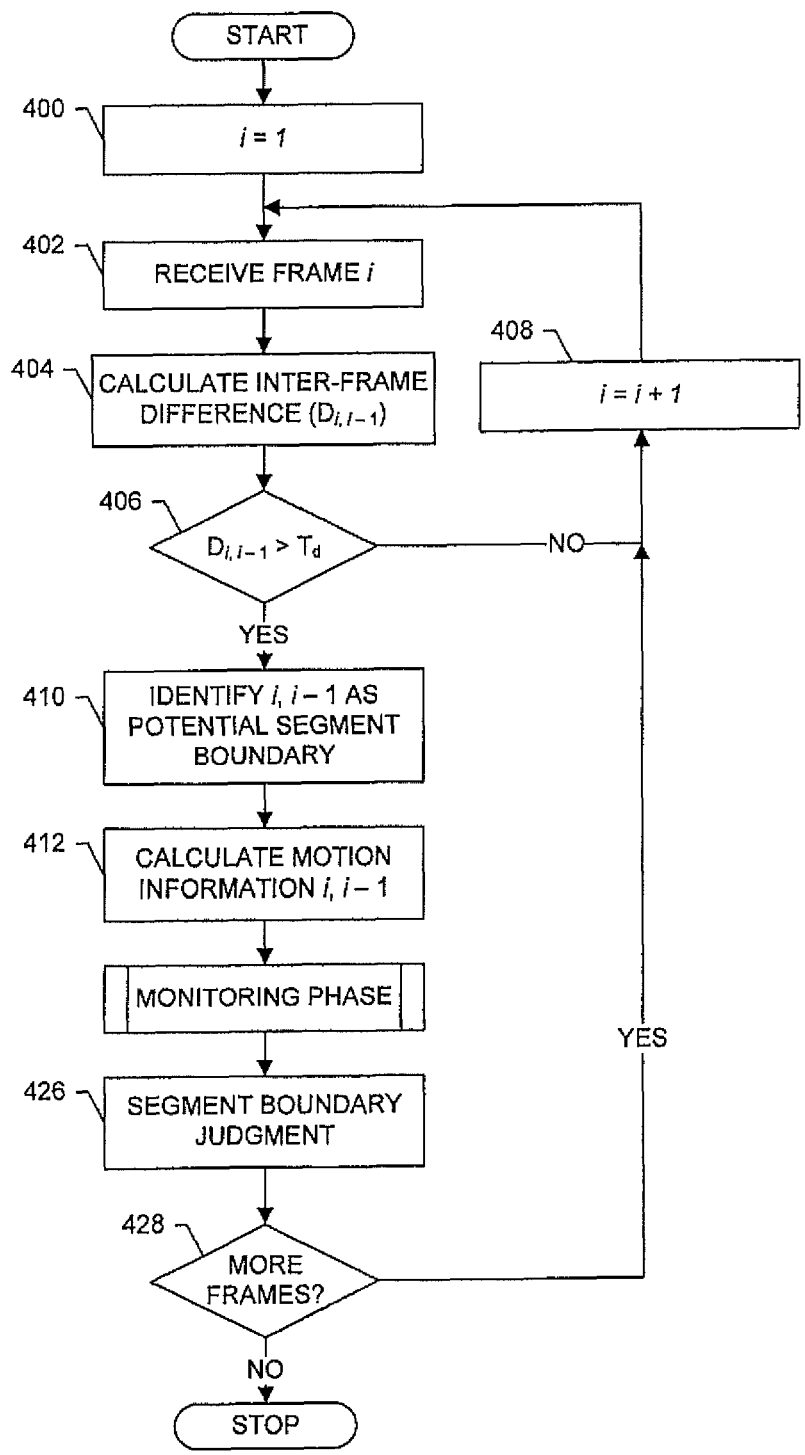
Figure 4B:
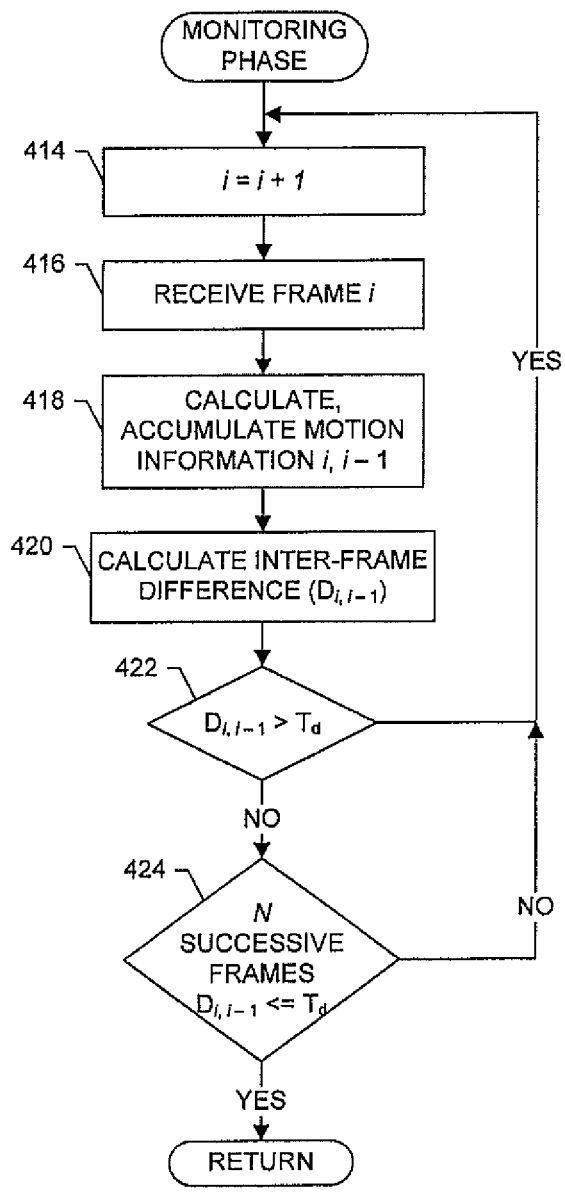

FIG. 4 (including FIGS. 4a and 4b) illustrates flowcharts of various operations in a method of detecting a segment of a video sequence that may be performed by various means of the processing apparatus 104, such as by the segment detector 302 of apparatus 300, according to example embodiments of the present invention. Generally, the method may include receiving and analyzing successive pairs of frames of a video sequence, and based on the analysis, identify the boundary between two segments of the video segment or otherwise identify the beginning of a segment of the video sequence. The method may be divided into a number of phases, including a potential segment boundary phase, a monitoring phase and a segment boundary judgment phase.

As shown in block 400 of FIG. 4a, the method may include initiating a frame counter i, such as i=1. The method may then enter the potential segment boundary phase, which generally identifies a subset of frames of a video sequence that may define a boundary between segments, namely, the end of one segment and/or the beginning of another segment. These potential boundary frames may be identified based on an analysis between pairs of successive frames. For example, the potential boundary frames may be identified based on a difference between pairs of successive frames, or more particularly, a difference between values of one or more properties of pictures of pairs of successive frames. Thus, the potential segment boundary phase may include receiving a current frame i and calculating an inter-frame difference between the current frame i and immediately preceding frame i−1, as shown in blocks 402 and 404. More particularly, for example, calculating the inter-frame difference may include calculating an inter-frame difference $D_{i, i-1}$ between values of one or more properties of pictures of the respective frames. These properties may include, for example, pixel value and color histogram.

The pixel value g may be represented as a gray value (e.g., 0-255) of a pixel of a frame picture. For a color picture, the value of a pixel (pixel value) may be calculated from its red R, green G and blue B component colors (generally "RGB"), such as in the following manner:

$$g = 0.30 \times R + 0.59 \times G + 0.11 \times B \tag{1}$$

For i=0, the pixel value of all pixels may be set to zero.

The color histogram of a frame picture is generally a representation of the distribution of colors in the picture, and may be generated by first quantizing each pixel of the picture according to its RGB component colors. In one example embodiment, each component color R, G, B of a pixel may be represented by a byte of data:

$R=(R_8 \ R_7 \ R_6 \ R_5 \ R_4 \ R_3 \ R_2 \ R_1)$
$G=(G_8 \ G_7 \ G_6 \ G_5 \ G_4 \ G_3 \ G_2 \ G_1)$
$B=(B_8 \ B_7 \ B_6 \ B_5 \ B_4 \ B_3 \ B_2 \ B_1)$

In this example embodiment, the color histogram value for the pixel may be calculated by first quantizing the RGB component colors of a pixel into 4:4:4 bits. The color histogram H for a frame may be calculated by placing each quantized component color of each pixel of the picture of the frame into one of a respective subset (e.g., 16) of a number of bins (e.g., 48), and then counting the number of pixels in the respective bins. For i−1=0, the RGB component colors of all pixels, and hence the color histogram, may be set to zero.

In one example where the RGB component colors are quantized into 4:4:4 bits, the color histogram may be employ 48 bins including three subsets of 16 bins for occupying the quantized bits of the respective component colors (4 bits occupying 16 bins for 3 component colors). Thus, for example, the 4-bit red component color for a pixel may be placed into a respective one of bins 1-16, the 4-bit green component color for the pixel may be placed into a respective one of bins 17-32, and the 4-bit blue component color for the pixel may be placed into a respective one of bins 13-48. The color histogram for the frame may then be calculated by counting the number of pixels in the respective bins.

An inter-frame difference between the pictures of frames i and i−1 may be calculated as a function of the pixel values and color histograms for the respective frames. In one example, the inter-frame difference $D_{i, i-1}$ may be calculated in accordance with the following:

$$D_{i,i-1} = HistDiff(H_{i-1}, H_i) \times GrayDiff(g_{i-1}, g_i), \quad (2)$$

where $$HistDiff(H_{i-1}, H_i) = \sum_{bin=1}^{Bin} (H_{i-1}(bin) - H_i(bin))^2 / (w \times h) \quad (3)$$

$$GrayDiff(g_{i-1}, g_i) = \sum_{x=1, y=1}^{w,h} (g_{i-1}(x, y) - g_i(x, y))^2 / (w \times h) \quad (4)$$

In the preceding, bin represents the number of pixels placed into a respective one of the bins of the color histogram, Bin represents the total number of bins in the histogram (e.g., 48), w and h represent width and height of the picture (in pixels), and x, y represent the coordinates of a pixel.

After calculating the inter-frame difference $D_{i, i-1}$, the difference may be compared to a threshold $T_d$ to determine whether a distinct change occurs between the respective frames, as shown in block 406. The threshold may be set in any of a number of different manners to any of a number of different values (e.g., 40), and may be adjusted with or otherwise adapted to the video content. In one example, the threshold may be initially set, and for each next frame, adjusted according to a previous number (e.g., 100) of inter-frame difference values, which reflect the content activity. In one example, the threshold may be adjusted (increased/decreased) in intervals of a particular number (e.g., 10). A significant number of difference values above the initially-set or current threshold (e.g., 90 maximal threshold) may indicate content of high activity, and the threshold may be increased; or a significant number of difference values below the initially-set or current threshold (e.g., 30 minimal threshold) may indicate content of low activity, and the threshold may be decreased.

In another example, the threshold $T_d$ may be initially set, and for each next frame, adjusted according to the focal length of the respective frame as it may be generally the case that pictures become less stable as the focal length increases. In an instance in which a picture of the next frame has a longer focal length than a picture of the current frame (absolutely or by a certain amount), such as in a manner that may reflect a zooming operation, the initially-set or current threshold may be increased. Alternatively, in an instance in which the picture of the next frame has a shorter focal length than the picture of the current frame (absolutely or by a certain amount), the initially-set or current threshold may be decreased.

In an instance in which the inter-frame difference $D_{i, i-1}$ is less than or equal to the threshold $T_d$, the current and next frames may not be considered to define a segment boundary. In such an instance, the frame counter may be incremented, the next successive frame may be received and the process repeated to calculate the inter-frame difference between the now current frame (former next frame) and next successive frame, as shown in blocks 408, 402 and 404.

In an instance in which the inter-frame difference $D_{i, i-1}$ is greater than the threshold $T_d$, the current and next frames may be identified as a potential segment boundary, as shown in block 410. In this instance, motion information between the respective frames may be calculated, as shown in block 412, and the process may enter the monitoring phase. As explained below, similar motion information may also be calculated between one or more pairs of successive frames following the current frame. The motion information for the current and next frames and the one or more successive pairs of frames following the current frame may be accumulated. This accumulated motion information may in various instances reflect significant camera movement during capture of the video sequence, and may be used to eliminate meaningless camera shake or reciprocate camera movement.

The motion information between the current frame i and previous frame i−1 may be calculated in a number of different manners. In one example, the picture of each frame may be split into a fixed number of equal, non-overlapping blocks (e.g., 8×8 matrix of blocks), which may be compared with one another to obtain motion vectors for the respective blocks. More particularly, for each block of the current frame i, a predicted motion vector may be acquired based on motion vectors calculated for preceding frames up to the current frame; and a predicted block of the previous frame i−1 may be identified as the frame from which the predicted motion vector points to the block of the current frame.

Figure 5A:
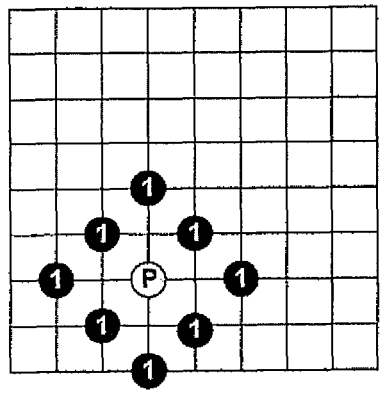

A diamond search method may then be employed to find, for each block of the current frame i, a most-closely matching block in the previous frame i−1. As shown in FIG. 5 (including FIGS. 5a-5d), for example, the diamond search method may employ two patterns, namely a big diamond pattern followed by a small diamond pattern. As shown in FIG. 5a, for each block of the current frame i, the big diamond pattern includes a first plurality (e.g., nine) of search blocks of the previous frame i−1 about the respective predicted block of the previous frame. Each block in the figures may be represented by a point. For each search block, a sum of absolute differences (SAD) operation may be performed to calculate a SAD between the predicted block $blk_{cur}$ and each of the search blocks $blk_{srch}$, such as in accordance with the following:

$$SAD = \sum_{x=1,y=1}^{w_b, h_b} |blk_{cur}(x_b, y_b) - blk_{srch}(x_b, y_b)| \quad (5)$$

In the preceding, $blk_{cur}(x_b, y_b)$ and $blk_{srch}(x_b, y_b)$ represent the value of one or more properties of corresponding pixels ($x_b$, $y_b$) of the predicted block and a search block, respectively; and $w_b$ and $h_b$ represent width and height of the respective blocks (in pixels).

Figure 5B:
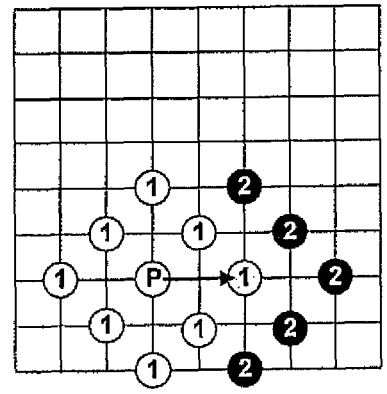
Figure 5C:
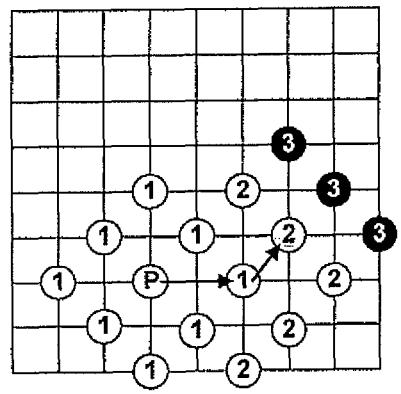
Figure 5D:
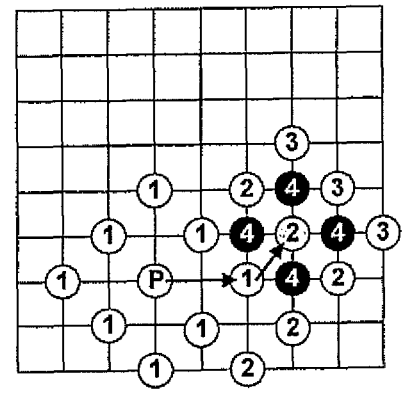

The search block having the smallest SAD with the predicted block may be selected as the center of a next big diamond pattern, which may have one or more points in common with the previous big diamond pattern, as shown for example in FIG. 5b. The method may then repeat for one or more additional iterations by calculating a SAD between the predicted block and each of the search blocks of the next big diamond pattern, but additionally including the center block of the next big diamond pattern as a search block of the respective pattern. One or more additional iterations may be performed until the search block having the smallest SAD with the predicted block is the same as the center block of a big diamond pattern, as shown in FIG. 5c. In this instance, the method may continue in a manner similar to the additional iterations of the big diamond pattern, but using a small diamond pattern including a second plurality (e.g., four) of search blocks about the center block of the last big diamond pattern, as shown in FIG. 5d. That is, a SAD may be calculated between the predicted block and each of the search blocks of the small diamond pattern (including its center block). The search block of the small diamond pattern having the smallest SAD with the predicted block, then, may be selected as the block of the previous frame i−1 most-closely matching the block of the current frame i, and the distance between the positions of the respective blocks may then be calculated as a motion vector for the block of the current frame. The method may then repeat for the other blocks of the current frame.

After calculating motion vectors of the blocks of current frame i, the motion vectors may be accumulated to form motion information for the current frame i and previous frame i−1. This motion information may be cached or otherwise stored for later accumulation with similar motion information calculated for one or more further successive pairs of frames during the monitoring phase.

FIG. 4b illustrates various operations in the monitoring phase. As shown in blocks 414 and 416, the monitoring phase may include incrementing the frame counter and receiving the next and now current frame. Motion information for the current frame i and previous frame i−1 may be calculated, such as in a manner similar to that explained above, and accumulated with the cached motion information to form a global motion parameter, as shown in block 418. This accumulated motion information may be similarly cached for further accumulation with one or more later successive pairs of frames, as appropriate.

The monitoring phase may continue until the inter-frame difference $D_{i, i-1}$ between the pictures of N successive frames i and i−1 is less than or equal to threshold $T_d$. Thus, the monitoring phase may also include calculating the inter-frame difference between the current frame i and immediately preceding frame i−1, and comparing the difference to threshold, as shown in blocks 420 and 422. In an instance in which the inter-frame difference greater than the threshold, the frame counter may again be incremented, the next successive frame may be received and the process repeated to calculate and further accumulate with the global motion parameter, and calculate and compare the inter-frame difference to the threshold, as shown in blocks 414, 416, 418, 420 and 422. In an instance in which the inter-frame difference is less than or equal to the threshold, a judgment may be made as to whether N successive frames have an inter-frame difference similarly less than or equal to the threshold, as shown in block 424. If no, the process may repeat until the condition is satisfied, at which point the monitoring phase terminates.

Returning to FIG. 4a and as shown at block 426, following the monitoring phase, the segment boundary judgment phase may be performed to determine whether the frames identified as a potential segment boundary during the potential segment boundary phase qualify as an actual segment boundary. To qualify as an actual segment boundary, one or more of a number of conditions may be satisfied. As a first condition, the amplitude of the motion information may be judged to determine whether it is at least a predetermined value, since a new segment may occur when the camera movement during capture of the video sequence covers a sufficient distance. As a second condition, the orientation of the motion information may be compared to the orientation of the motion information from a previous monitoring phase to thereby eliminate two adjacent segment boundaries where the camera may move along the same direction. And as a third condition, the current frame i at the end of the monitoring phase may be judged to determine whether it is different from the current frame before the monitoring phase began. This third condition may further validate the segment boundary based on the fact that frames before and after a segment boundary should be distinct. The difference HistDiff between the color histograms of the pictures of the respective frames, shown above in equation (3), may be used to measure the difference between frames for purposes of the third condition.

After identifying the potential boundary as an actual boundary between segments of the video sequence, in an instance in which the video sequence includes additional frames, as shown in block 428, the frame counter may be incremented and the method of detecting a segment may repeat to identify a next segment boundary. Also after identifying an actual segment boundary, the frames of the segment may be analyzed, and based on the analysis, one or more key frames of the segment may be identified.

Figure 6A:
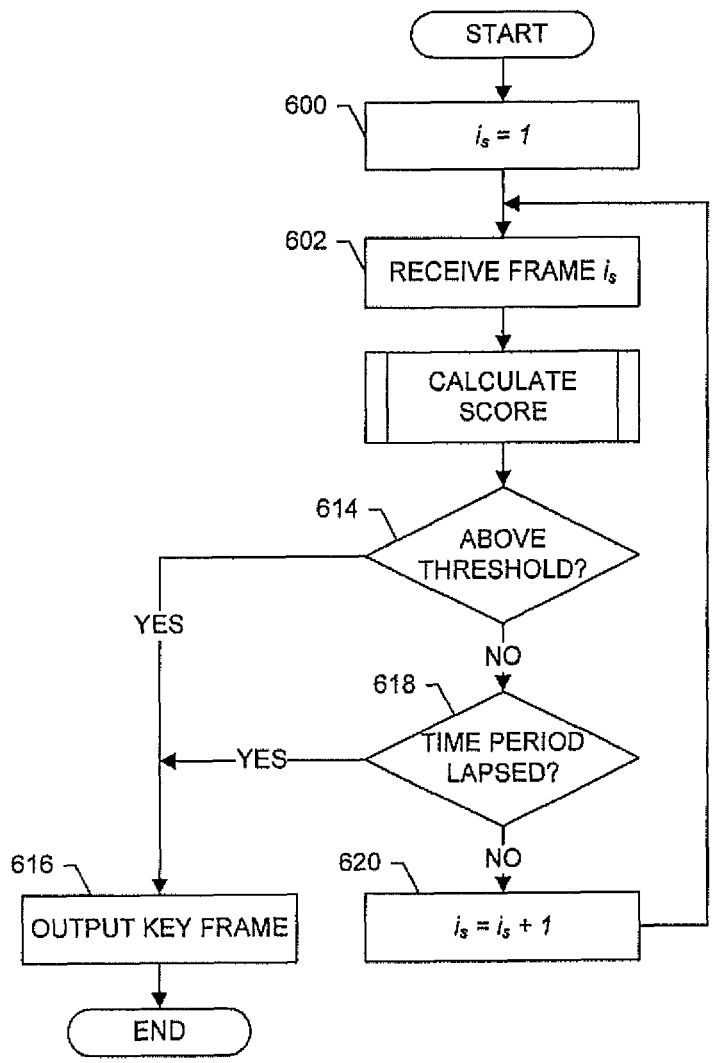
Figure 6B:
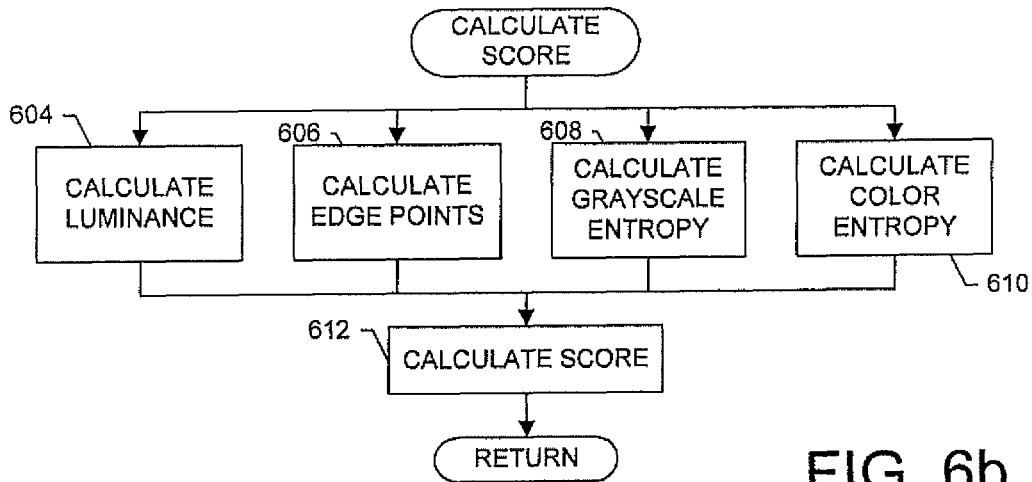

FIG. 6 (including FIGS. 6a and 6b) illustrates flowcharts of various operations in a method of identifying one or more key frames from a segment of a video sequence, which may be performed by various means of the processing apparatus 104, such as by the key frame extractor 304 of apparatus 300, according to example embodiments of the present invention. Generally, the method may include receiving and analyzing frames of a segment of a video sequence, and based on the analysis, identify one or more key frames that may have high information and perceptual value. As shown in blocks 600 and 602 of FIG. 6a, the method may include initiating a segment frame counter $i_s$ (e.g., $i_s=1$) and receiving a current frame $i_s$ of the segment. The method may then include calculating a score for the current frame as a function of values of one or more properties of the picture, such as values of the luminance, edge point detection, grayscale entropy and/or color entropy of the picture, as shown in blocks 604, 606, 608 and 610 of FIG. 6b.

The luminance (block 604) of a picture generally represents a measure of the luminous intensity of a surface in a given direction per unit of area, and its inclusion in the score may enable avoiding identifying as a key frame, a frame that is darker than desired. The luminance L of a picture of frame $i_s$ may be calculated in a number of different manners, but in one example, may be calculated as the average of the pixel values g(x, y) in a frame:

$$L = \sum_{x=1, y=1}^{w,h} g(x, y)/(w \times h) \quad (6)$$

where the pixel values $g_{i_g}$ (x, y) may be calculated in accordance with equation (1).

Edge point detection values (block 606) in the picture may be calculated in accordance with an edge point detection technique. Generally, an edge may define a boundary in a picture, and may be considered a point or pixel in the picture at which the intensity of the picture exhibits a sharp change (discontinuity). Edge detection may be useful to determine whether a picture depicts an object. One suitable edge detection technique that may be employed in example embodiments of the present invention is the Roberts' Cross operator, which may be represented as follows:

$$E_{R(x,y)} = |p_{x,y} - p_{x+1,y+1}| + |p_{x+1,y} - P_{x,y+1}| \quad (7)$$

where $E_{R(x,y)}$ represents a gradient magnitude and, $p_{x,y}$ represents the intensity of pixel (x, y). A statistical value $E_R$ (edge point detection value) representative of the number of edge points that exceed a threshold $Th\_E_R$, then, may be calculated as follows:

$$E_R = \text{card}(E_{R(x,y)} | E_{R(x,y)} > Th\_E_R) \quad (8)$$

The entropy of a picture generally represents the degree of organization of information within the picture. The grayscale entropy $I_{gray}$ (block 608) of the picture may be calculated in accordance with the following:

$$I_{gray} = -\sum_g p_g \log p_g \quad (9)$$

where, again, g represents the pixel value of a plurality of pixel values (e.g., 0-255), and $p_g$ represents the probability of any pixel of the picture having the gth pixel value. Similarly, the color entropy $I_{color}$ (block 610) of the picture may be calculated in a manner similar to equation (9), but by further summing the entropies of each of the RGB component colors:

$$I_{color} = -\sum_{bin}^{Bin} p_c \log p_c \quad (10)$$

In equation (10), $p_c$ represents the probability of any quantized RGB component color of any pixel of the picture being placed in the binth bin of the bins of the color histogram. In this equation, it is recognized that as a component color may be placed into a bin of a respective subset of the bins, the probability of that component color being placed into bins of the other subsets may be zero.

After calculating the luminance L, gradient magnitude statistic $E_R$ and entropies $I_{gray}$ and $I_{color}$, a score S may be calculated from the calculated values of the respective properties of the picture, as shown in block 612. In one example embodiment, the filter score may be calculated as a weighted sum of the values of the properties, such as in accordance with the following:

$$S = L \times w_{lum} + E_R \times w_{edge} + I_{gray} \times w_{gray\_entropy} + I_{color} \times w_{color\_entropy} \quad (11)$$

In the preceding, $w_{lum}$, $w_{edge}$, $w_{gray\_entropy}$ and $w_{color\_entropy}$ represent weight coefficients. These coefficients may be selected in a number of different manners, and in one example embodiment, are subject to the condition: $w_{lum} + w_{edge} + w_{gray\_entropy} + w_{color\_entropy} = 1$.

After calculating the score S, the method may include comparing the score to a predefined threshold, as shown in block 614. In an instance in which the score is above the predefined threshold, the frame may be output as a key frame of the segment of the video sequence, which may be in a number of different manners such as for fast browsing, tagging, summarization or the like, as shown in block 616. Otherwise, in an instance in which the filter score is at or below the predefined threshold, the frame counter may be incremented, as shown in block 620, and the process repeated by receiving the next (and now current) frame of the segment, calculating a score for the frame and comparing the score to the predefined threshold. In this regard, it may be desirable to output a frame as a key frame within a specified time period (e.g., two seconds). In an instance in which a frame having a score above the predefined threshold is identified within the specified time period, the respective frame may be output as a frame. However, in an instance in which a frame having a score above the predefined threshold is not identified within the specified time period, as shown in block 618, the current or a previously analyzed frame of the segment may be output as a key frame. The frame output as a key frame may be selected in any of a number of different manners, such as by selecting the frame having the highest score from among the one or more frames analyzed within the specified time period those scores are not above the predefined threshold.

In various instances, another frame of a segment may be more representative of the segment than the frame output as the key frame output in accordance with the method of FIGS. 6a and 6b. Thus, the key frame of a segment may be updated with another frame of the segment at one or more instances after the key frame or a previous update is output. Reference is now made to FIG. 7, which is a flowchart illustrating various operations in a method of updating a key frame of a segment of a video sequence that may be performed by various means of the processing apparatus 104, such as by the key frame update module 306 of apparatus 300, according to example embodiments of the present invention.

After outputting a key frame of a segment (see FIG. 6a, block 614), the method of updating the key frame may include incrementing the segment frame counter $i_s$ and receiving a current frame $i_s$ of the segment, as shown in blocks 700 and 702. In this regard, the segment frame counter may not be reset or initialized following output of the key frame to thereby permit comparison of the key frame with frames not yet having been analyzed as per FIGS. 6a and 6b. The method may include calculating a score for the current frame, such as in accordance with equation (11), as shown in blocks 604, 608, 610 and 612. Then, as shown in blocks 704 and 706, a weighted score of the current frame $S_{cur}$ may then be compared to the score of the output, and thus current, key frame $S_{key}$, such as to determine if the weighted score of the current frame is greater than that of the key frame, such as in accordance with the following:

$$S_{cur} \times w_{cur} > S_{key} \quad (12)$$

where $w_{cur}$ represents a weight coefficient. The weight coefficient of the score of the current frame may be initialized to a particular value (e.g., $w_{cur} = 1$). The weight coefficient may be periodically adjusted to account in instances in which the key frame score is significantly greater than the current frame score, which may imply that that the key frame has a significant coverage and should be maintained even in the event the absolute score of a next current frame in the segment is greater than the score of the current frame. In this case, the weight coefficient may be decreased to require of the score of the next current frame to be even greater than the score of the key frame to satisfy the inequality of equation (12).

In an instance in which the weighted current frame score is above the key frame score, the key frame may be updated with the current frame, as shown in block 708. This update may include, for example, replacing the frame output as the key frame with the current frame, and outputting the current frame as the key frame. In an instance in which the weighted current frame score is equal to or below the key frame score, the key frame may be maintained. The process may then repeat for other frames in the segment, as shown at block 710, during which the frame counter may be incremented, the next (and now current) frame of the segment may be received, and a weighted score for the frame may be compared to the score to the current key frame (as updated).

In various instances, it may be desirable to output more than one frame as a key frame when the segment includes more than a threshold number of frames, which may indicate a lengthy scene. Thus, the method of updating a key frame may terminate when the segment counter reaches the threshold number of frames, as shown in block 712. In this regard, each threshold number of frames of the segment may be considered a portion of the segment, with any remaining frames less than the threshold number also considered a portion. The method of example embodiments of the present invention may therefore set the current key frame as the key frame of the first portion of the segment, and repeat the methods of FIGS. 6a, 6b and 7 to identify and, if appropriate update, a key frame for the next, second portion of the segment. This process may repeat for one or more portions after the first portion, but in one example, may repeat for each portion after the first portion. The process may also be performed by various means of the processing apparatus 104, such as by the long segment determination module 308 of apparatus 300, according to example embodiments of the present invention.

Figure 8A:
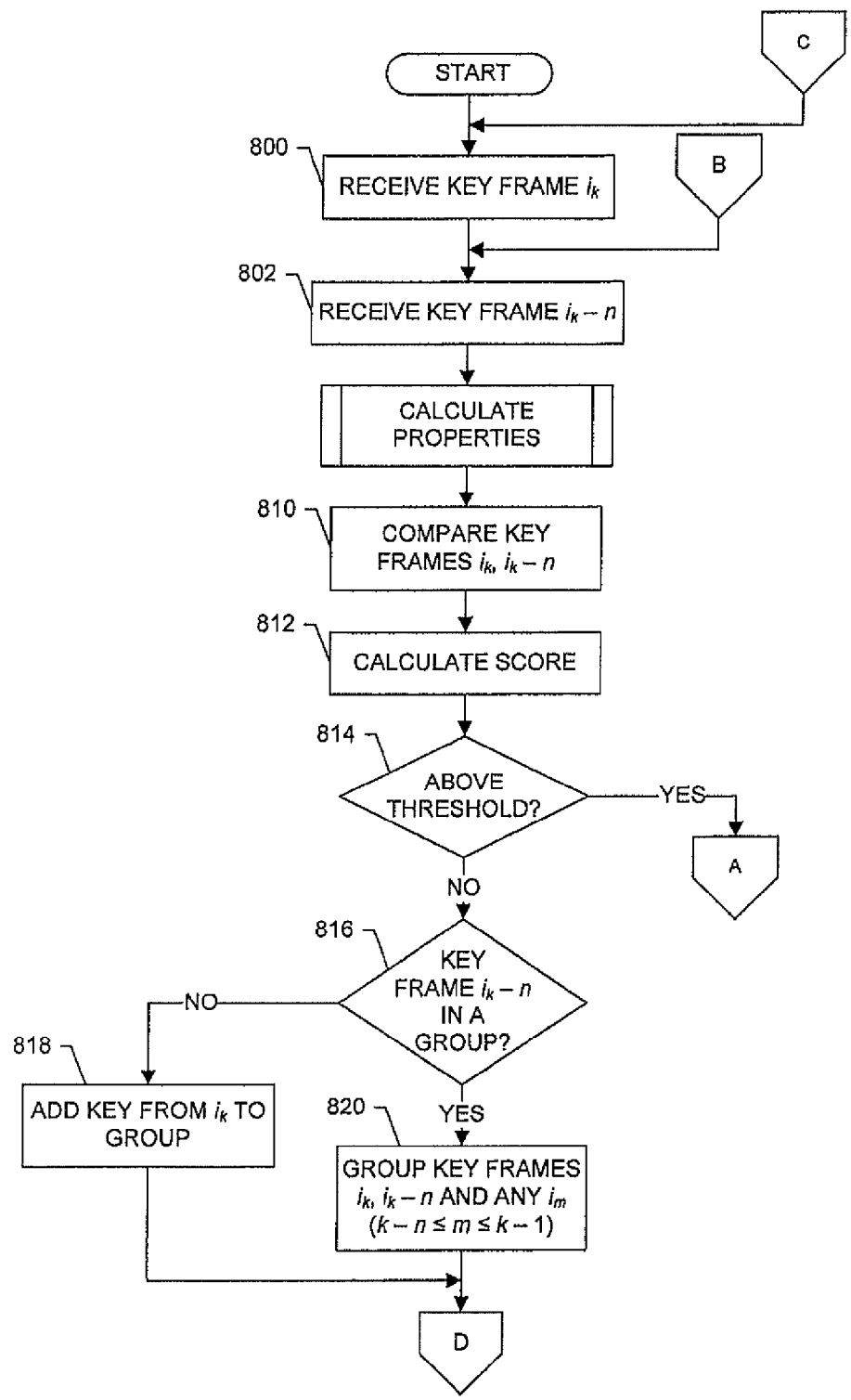
Figure 8B:
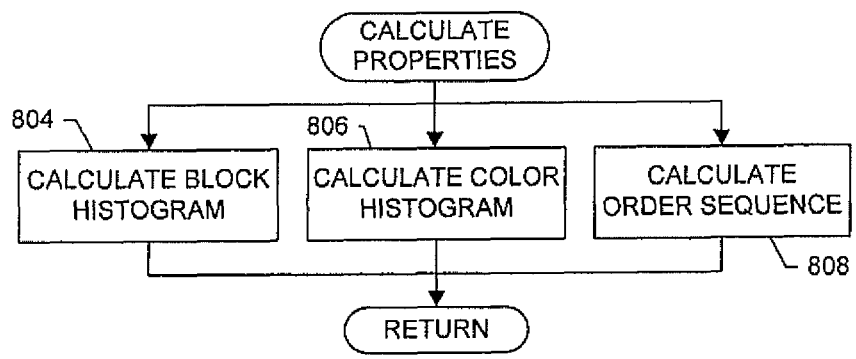
Figure 8C:
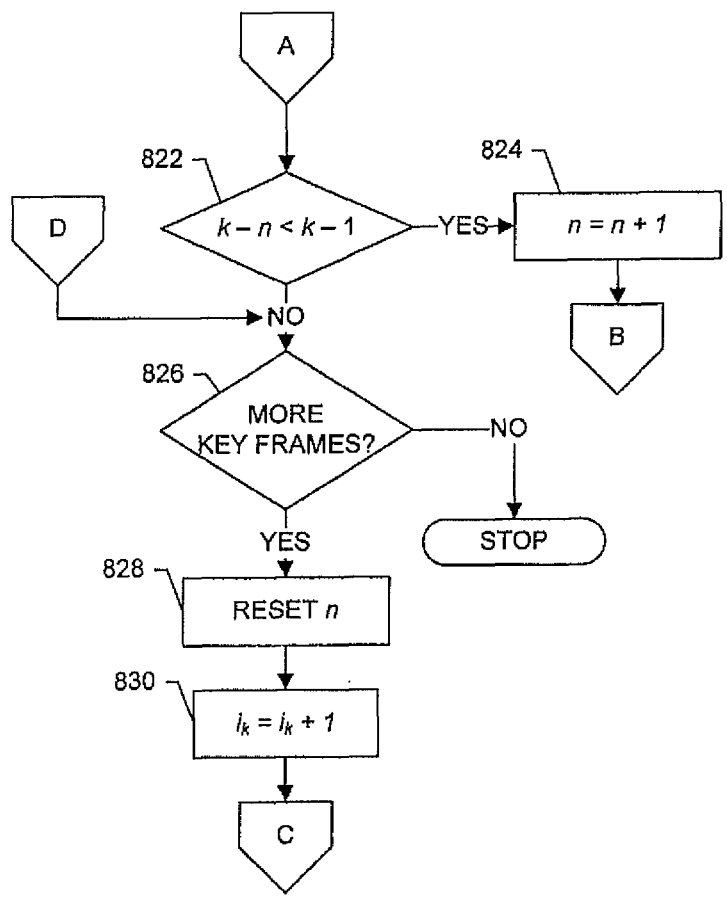

Example embodiments of the present invention may further provide a method of grouping key frames identified as being similar to one another, which may indicate segments representative of a common scene. FIG. 8 (including FIGS. 8a, 8b and 8c) illustrates flowcharts of various operations in a method of grouping key frames of a video sequence that may be performed by various means of the processing apparatus 104, such as by the key frame grouping module 310 of apparatus 300, according to example embodiments of the present invention. Generally, the method may include receiving and analyzing key frames of a plurality of segments, and based on the analysis, grouping similar key frames.

As shown in blocks 800 and 802 of FIG. 8a, the method may include receiving a current key frame $i_k$ and a previous key frame $i_k-n$. In the preceding, the variable n is a previous key frame counter, represents a number of key frames before the current key frame to thereby define a search window for similar frame(s), and may be initialized to any of a number of different values (e.g., n=3). In one example, the variable n may indicate the previous frames extracted from $i_k$ in a time slot, which may be an empirical parameter (e.g., the last two minutes). The previous key frame counter in various instances may be considered in terms of number of frames or time. The key frame index k may be initialized at any of a number of different values greater than one, and in one example embodiment may be initialized to a value n+1.

After receiving the current and previous key frames $i_k$, $i_k-n$, the method may include calculating values of one or more properties of pictures of the current and previous key frames. These properties may include, for example, a block histogram, color histogram and order sequence, their respective calculations being shown in blocks 804, 806 and 808 of FIG. 8b.

The block histogram (block 804) of a frame picture may be generated by splitting the picture into a fixed number of equal smaller blocks (e.g., six blocks), and calculating the histogram and statistical properties (e.g., mean μ and variance σ) for each block. Similar to the color histogram, the block histogram of a picture may represent different numbers of pixels of a block having the same intensity values. The histogram of a block may be calculated by grouping the pixels (e.g., gray-scaled pixels) of the block with the same intensity value, and representing the number of same-valued pixels versus their respective intensity values. Statistical properties of the block, such as its mean μ and variance σ, may then be calculated from the histogram, such as in accordance with the following (assuming the histogram obeys a Gaussian distribution):

$$\mu = \frac{\sum i \times H(i)}{\sum H(i)}, \qquad (13)$$

$$\sigma = \frac{1}{w \times h - 1} \sum_{x,y} [\mu - p_{x,y}]$$

In the preceding, H(inten) represents the sum of the number of pixels within the picture having an intensity inten, producing a histogram height of intensity I.

The color histogram H (block 806) of the frame picture may be calculated in a number of different manners, such as in the manner described above in which the RGB component colors of the picture may be quantized. Statistical properties (e.g., mean μ and variance σ) for the color histogram may then be calculated from the quantized values c across the pixels of the picture, such as in a manner similar to equation (13).

Calculating the order sequence (block 808) of a frame picture may utilize the block-histogram calculated smaller blocks and histogram statistical properties for each block. For example, the blocks of the picture may be ranked according to their mean values μ, such as from the block with the lowest mean to the block with the highest mean. This is shown in FIG. 8 for the pictures of two frames. In the example of FIG. 9, the pictures each include six blocks that may be ranked from 1 to 6 according to their respective mean values from the lowest mean value to the highest mean value. For the top picture shown in the figure, the blocks having mean values of 12 and 214 may be assigned the ranks of 1 and 6, respectively; and for the bottom picture, the blocks having mean values of 11 and 255 may be assigned the ranks of 1 and 6, respectively. The remaining blocks of the pictures may be similarly assigned rankings of 2-5 according to their respective mean values.

The order sequence may then be calculated by ordering the rankings of the blocks in the order of the blocks in the picture, such as from left-to-right, top-to-bottom; and concatenating to the ordering a repeated ordering of the rankings of the blocks. Returning to the example of FIG. 9, from left-to-right, top-to-bottom, the rankings of the blocks of the top picture may be ordered and repeated as follows: 412635412635. Similarly, the rankings of the blocks of the bottom picture may be ordered and repeated as follows: 532461532461.

After calculating values of one or more properties of pictures of the current and previous key frames $i_k$, $i_k-n$, the method may include comparing the values of the properties of the respective frames with one another, and calculating one or more values representative of the comparison so as to facilitate a determination of whether the current key frame is similar to the previous key frame, as shown in block 810. The comparison values between the current and previous key frames may include the absolute difference between the histogram mean values of the respective frames, diff-mean, which for each frame, may be calculated from the means of the blocks of the frame (block 804). The comparison values may additionally or alternatively include the absolute difference between the color histogram mean values of the frame and reference frame, diff-color-mean, for each frame, which for each frame, may be calculated from the color histograms of the respective frames (block 806).

The comparison values may additionally or alternatively include an order sequence comparison, order-seq, between the current and previous key frames $i_k$, $i_k$–n. The order sequence comparison may be calculated by calculating a longest common subsequence (LCS) between the order sequences of the respective frames (block 808), and applying a staircase function to the LCS. The LCS for a first sequence $X=(x_1, x_2, \ldots x_m)$ and second sequence $Y=(y_1, y_2, \ldots y_n)$ may be calculated as follows:

$$LCS(X_i, Y_j) = \begin{cases} 0 & \text{if } i = 0 \text{ or } j = 0 \\ (LCS(X_{i-1}, Y_{j-1}), x_i) & \text{if } x_i = y_i \\ \text{longest}(LCS(X_i, Y_{j-1}), LCS(X_{i-1}, Y_j)) & \text{if } x_i \neq y_i \end{cases} \quad (14)$$

In the preceding, LCS $(X_i, Y_j)$ represents the set of longest common subsequence of prefixes $X_i$ and $Y_j$. An example of the LCS between two order sequences is shown, for example, in FIG. 9.

After calculating the values representing the comparison between the current and previous key frames $i_k$, $i_k$–n, the method may include calculating a discriminator score $S_{discriminator}$ for the current key frame from the respective values, as shown in block 812. In one example embodiment, the discriminator score may be calculated as a weighted sum of the comparison values, such as in accordance with the following:

$$S_{discriminator} = \text{diff-mean} \times w_{diff\text{-}mean} + \text{diff-color-mean} \times w_{diff\text{-}color\text{-}mean} + \text{order-seq} \times w_{order\text{-}seq} \quad (15)$$

In the preceding, $w_{diff\text{-}mean}$, $w_{diff\text{-}color\text{-}mean}$ and $w_{order\text{-}seq}$ represent weight coefficients. These coefficients may be selected in a number of different manners, and in one example embodiment, are subject to the condition: $w_{diff\text{-}mean} + w_{diff\text{-}color\text{-}mean} + w_{order\text{-}seq} = 1$. Also, in one example embodiment, the differences between the histogram and color histogram mean values of the respective frames, diff-mean and diff-color-mean, may be calculated as linear functions with staircases at the top and bottom. In this example, differences below a predetermined lower value are set to the predetermined lower value, and that differences above a predetermined upper value are set to the predetermined upper value.

After calculating the discriminator score $S_{discriminator}$, the method may include comparing the discriminator score to a predefined threshold, as shown in block 814. In an instance in which the discriminator score is above the predefined threshold, the current key frame may be identified as being dissimilar to the previous key frame and the frames may not be grouped together. As shown in FIG. 8c, in instances in which other previous key frames $i_m$ (k–n≤m≤k–1) are positioned between the current and previous key frames $i_k$, $i_k$–n, the previous key frame counter n may be incremented and the next previous key frame may be received, as shown in blocks 822, 824 and 802. The process may then repeat for the next previous key frame (now just the previous key frame) relative to the current key frame. In instances in which no other previous keys frames are positioned between the current and previous key frames, however, for any key frames following the current key frame, the previous key frame counter n may be reset, the key frame counter $i_k$ may be incremented, and the entire process may repeat for the next key frame (now current key frame) relative to its previous key frame(s), as shown in blocks 826, 828 and 830.

Returning to FIG. 8a, in an instance in which the discriminator score $S_{discriminator}$ is at or below the predefined threshold, the current key frame $i_k$ and previous key frame $i_k$–n may be grouped together depending on whether the previous key frame is already part of a group of key frames, as shown in block 816. In an instance in which the previous key frame $i_k$–n is already part of a group, the current key frame $i_k$ may be added to that group, as shown in block 818. Alternatively, in an instance in which the previous key frame $i_k$–n is not already part of a group, the current and previous key frames $i_k$, $i_k$–n may be grouped together along with any intervening key frames $i_m$ (k–n≤m≤k–1) between the current and previous key frames, as shown in block 820 and in FIG. 10 by example. In either instance of grouping the current and previous key frame(s), the entire process may then repeat for any key frames following the current key frame. That is, the previous key frame counter n may be reset, the key frame counter $i_k$ may be incremented, and the entire process may repeat for the next key frame (now current key frame) relative to its previous key frame(s), as shown in blocks 826, 828 and 830 of FIG. 8c.

Figure 11A:
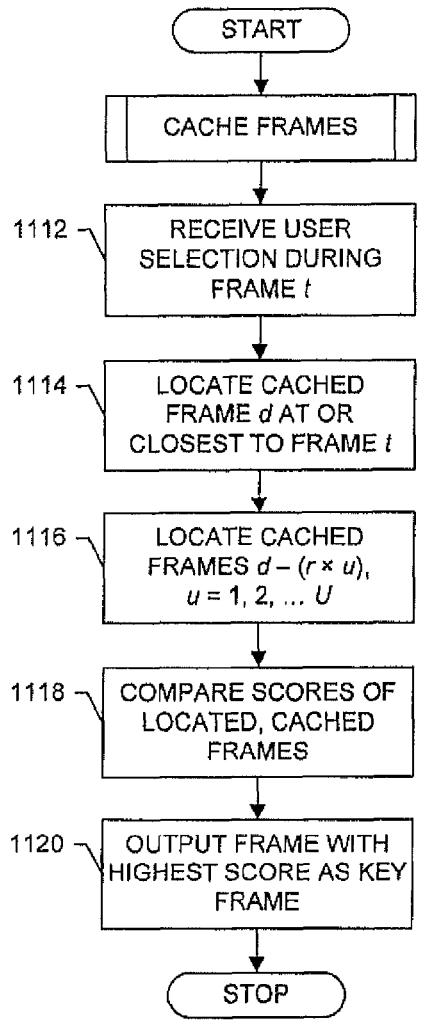
Figure 11B:
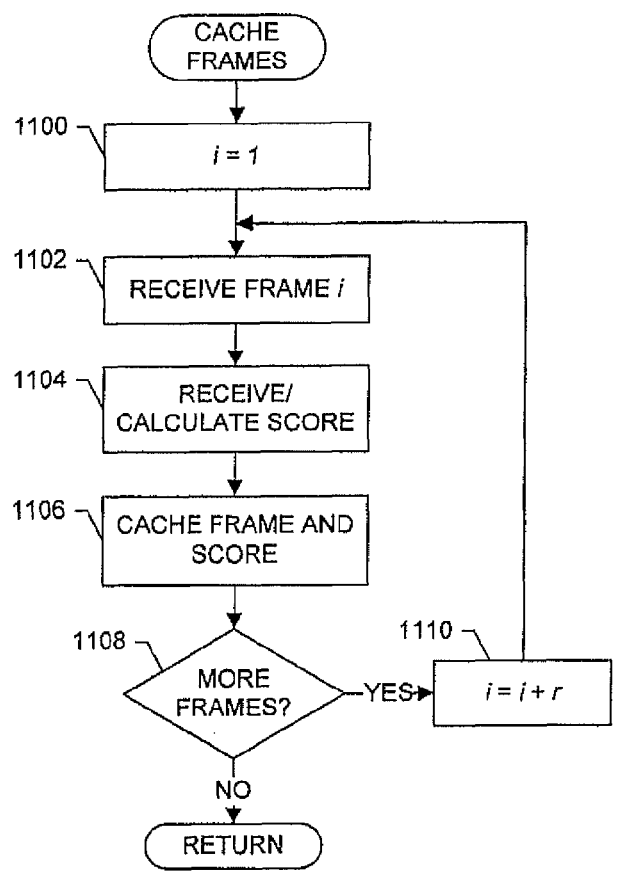

Example embodiments of the present invention may further permit user selection of a frame of a segment of the video sequence as a key frame, in addition to or in lieu of a frame identified as a key frame as described above. FIG. 11 (including FIGS. 11a and 11b) illustrates flowcharts of various operations in a method of receiving selection of and outputting a selected frame as a key frame of a segment of a video sequence that may be performed by various means of the processing apparatus 104, such as by the manual tagging module 312 of apparatus 300, according to example embodiments of the present invention. As shown, the method may include caching frames of the video sequence along with their scores S. More particularly, for example, the method may include initializing a frame counter i, receiving a current frame i, calculating or otherwise receiving a score for the current frame, and caching the current frame and its score, as shown in blocks 1100, 1102, 1104 and 1106. The score may be, for example, calculated in a manner similar to that described above with respect to equation (11), or received such as from the key frame extractor 304 of apparatus 300.

The process of caching frames and their scores may repeat for each frame of the video segment or otherwise the video sequence. In one example embodiment, however, the process may repeat with a lower sampling frequency such that the process repeats for each rth frame, as shown in blocks 1108 and 1110. The sampling interval r may be selected in a number of different manners, but in one example, a sampling interval of five is selected such that each fifth frame and its score may be cached.

As frames of the video sequence are received and some or all of the frames and their scores are cached, a user selection during frame t may be received, and in response thereto, a cached frame d at or closest to frame t may be located, as shown at blocks 1112 and 1114. This frame d may be output as a key frame of the video sequence or segment of the video sequence, but in one example embodiment, a more appropriate frame may instead be output as a key frame. In this regard, the method may also include locating up to a predetermined number of cached frames up to frame d, as shown in block 1116. These additionally-located, cached frames may be represented by the index d–(r×u), where u=1, 2, . . . , U. In one example, the predetermined number of frames may be set to six, although different numbers of frames are also possible.

After locating the cached frames, the scores of the located cached frames may be compared to identify the one with the highest score, as shown in block 1118. The located cached frame with the highest score may then be output as a key frame for the sequence or segment of the sequence, as shown in block 1120. In various instances, the frame may be output as a key frame in addition to or in place of another key frame for the segment or sequence.

As explained above, one or more frames of a video sequence may be output as key frames, one or more of which may be updated in various instances, such as for fast browsing, tagging, summarization or the like. The key frames may be output/updated in any of a number of different manners, such as to a memory device (e.g., memory device 204) of the apparatus 100 (e.g., apparatus 200). Additionally or alternatively, for example, the key frames may be output/updated to the display of a user interface (e.g., user interface 210) of the apparatus. In this regard, FIGS. 12-15 are example displays that may be presented by an apparatus in accordance with example embodiments of the present invention. The displays of FIGS. 12-14 may be particularly presented during capture of a video sequence by an image capture device (video source 102). It should be understood, however, that the same or similar displays may be equally presented during receipt of a previously-captured video sequence.

Figure 12:
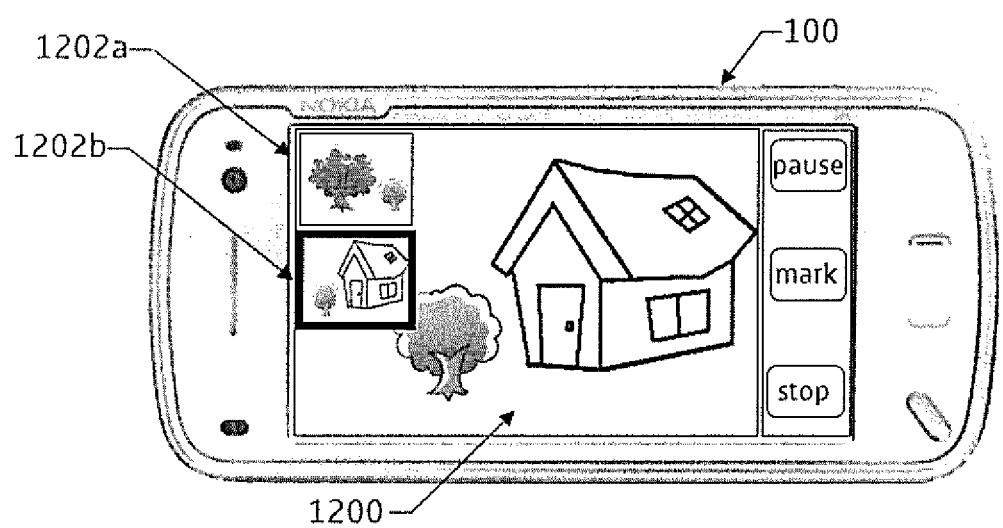

Referring to FIG. 12, as a video sequence is captured or otherwise received, the apparatus may output the video sequence 1200—or rather frames of the video sequence—to a display of the apparatus 100. In addition to outputting the video sequence to the display, the apparatus may also output key frame(s) of the video sequence to the display, such as in the form of thumbnails of the key frame(s) that may overlay the video sequence display. In this regard, FIG. 12 illustrates thumbnails of two key frames 1202*a*, 1202*b*. The illustrated key frames may be key frames of different segments of the video sequence, or may be key frames of the same long segment of the video sequence, either or both of which may have been manually selected by the user. Further, the key frames may be output to the display as the apparatus identifies or the user manually selects the key frames.

FIG. 13 (including FIGS. 13*a*-13*d*) illustrates a sequence of displays that may be presented by the apparatus 100 in accordance with example embodiments of the present invention, the displays illustrating key frame extraction and updating aspects of example embodiments. As shown in FIG. 13*a*, as a video sequence is captured or otherwise received, the apparatus may output the video sequence 1300 and a thumbnail of a key frame 1302*a* of a segment of the sequence to a display of the apparatus. In response to detecting that the segment is a long segment, or otherwise detecting a new segment, the apparatus may identify another key frame and output a thumbnail of the other key frame 1302*b* to the display, as shown in FIG. 13*b*.

Figure 13A:
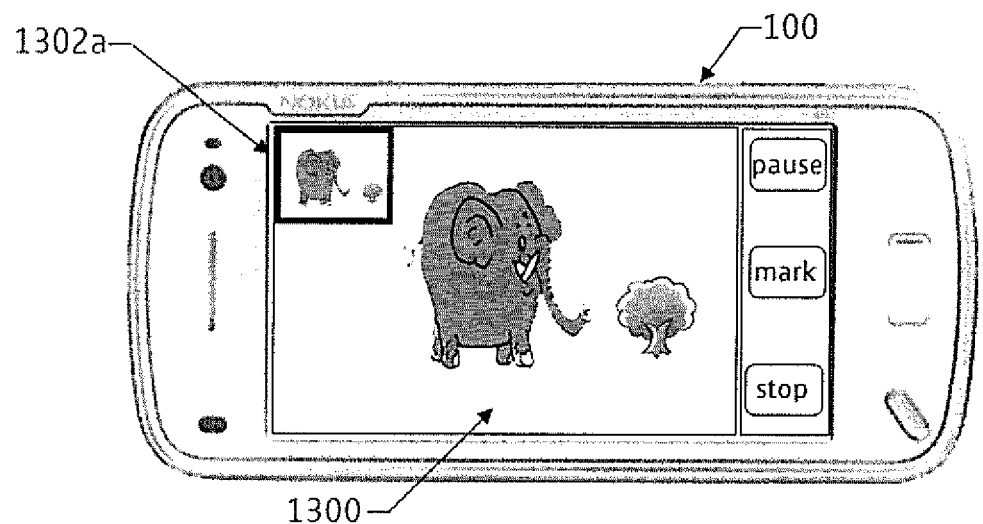
Figure 13B:
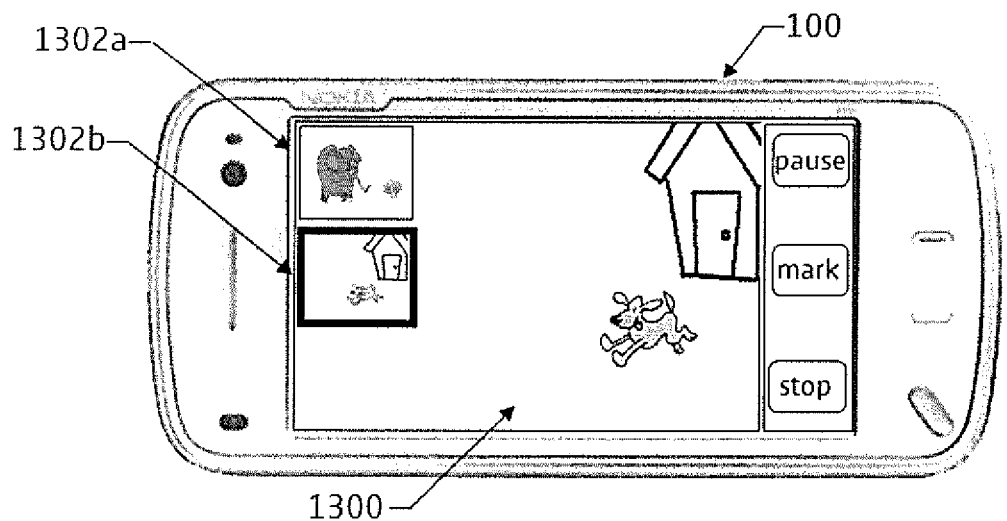
Figure 13C:
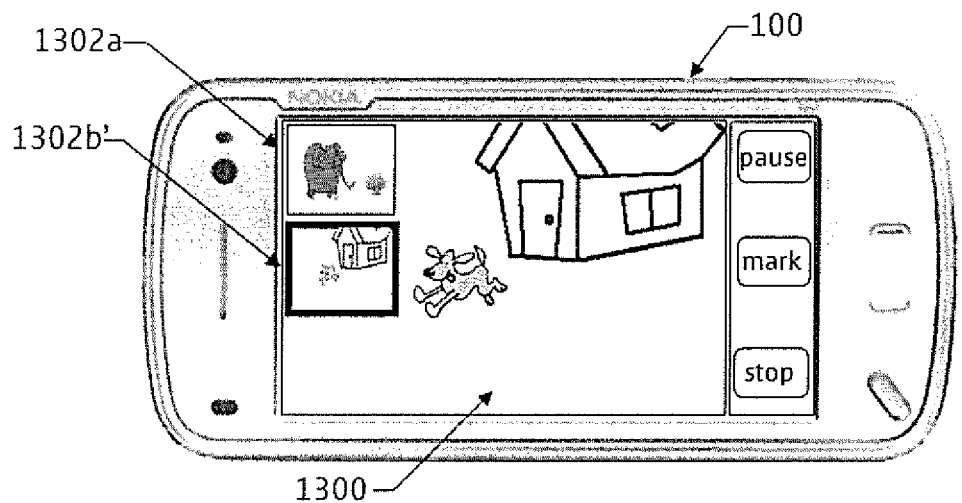
Figure 13D:
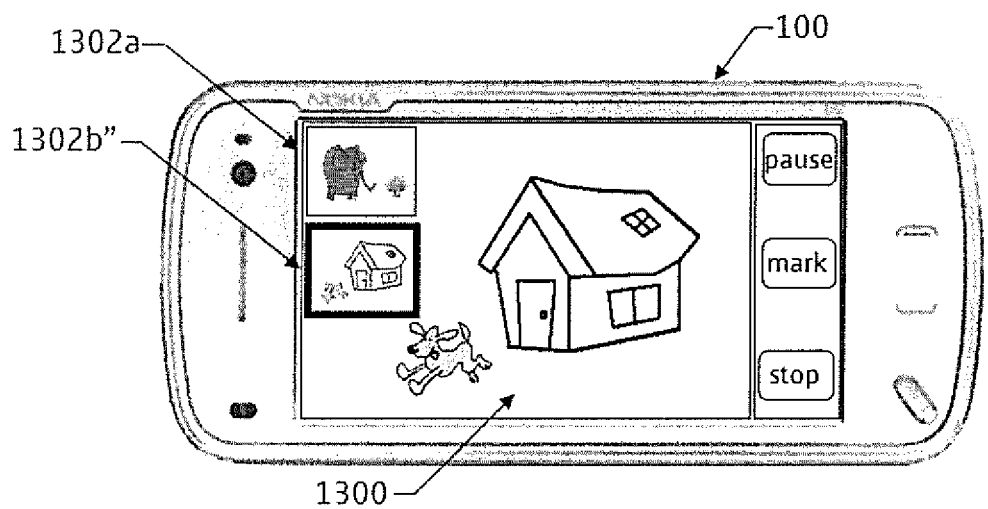

As the yet another frame following the key frame 1302*b* may be more representative of the segment, the apparatus may at one or more instances update the respective key frame with further frames of the segment. The first of these further frames may replace the current key frame, and any subsequent further frames may replace the then-current key frame before it. Thus, for example, FIG. 13*c* illustrates the apparatus updating key frame 1302*b* with another, subsequent frame 1302*b*', and replacing the thumbnail of the current key frame with that of the updated key frame. Similarly, for example, FIG. 13*d* illustrates the apparatus updating key frame 1302*b*' with another, subsequent frame 1302*b*'', and replacing the thumbnail of the former updated (and then current) key frame with that of the current updated key frame.

Figure 14A:
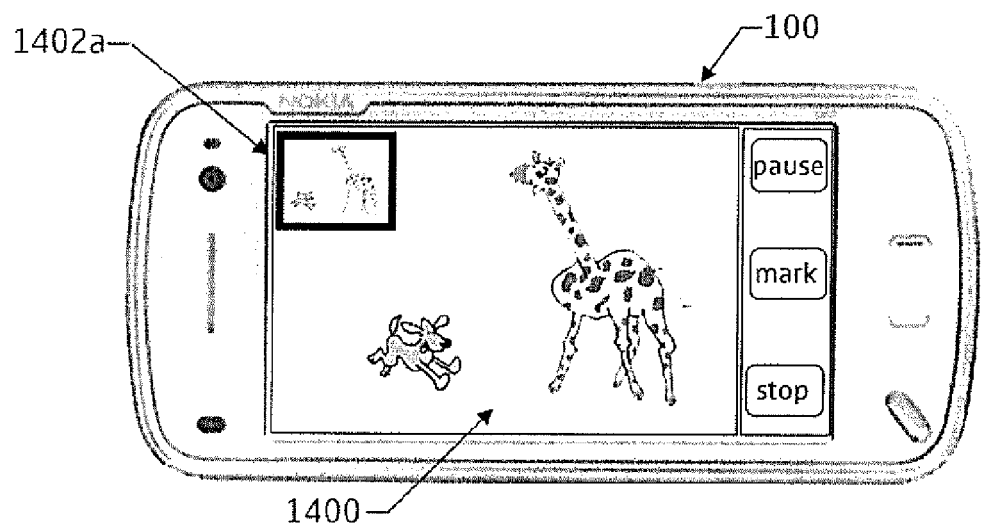
Figure 14B:
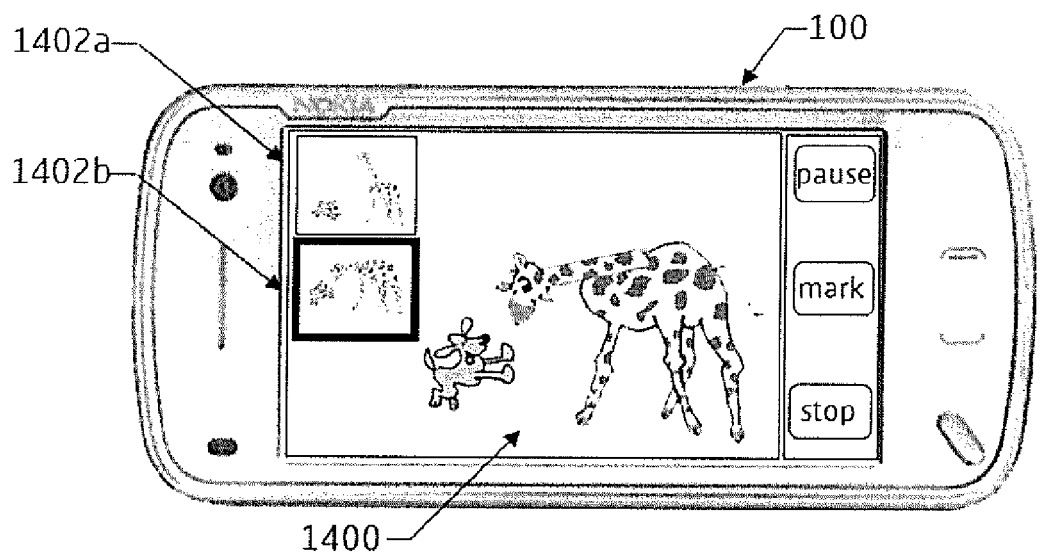

FIG. 14 (including FIGS. 14*a* and 14*b*) illustrates a sequence of displays that may be presented by the apparatus 100 in accordance with example embodiments of the present invention, the displays illustrating key frame extraction and updating aspects of example embodiments. Similar to the display of FIG. 13*a*, as shown in FIG. 14*a*, as a video sequence is captured or otherwise received, the apparatus may output the video sequence 1400 and a thumbnail of a key frame 1402*a* of a segment of the sequence to a display of the apparatus. In response to user selection of a frame or other input reflecting user selection—such as by effectuating a "Tag" soft key, the apparatus may identify and output another key frame and output a thumbnail of the other key frame 1402*b* to the display, as shown in FIG. 14*b*.

Figure 15A:
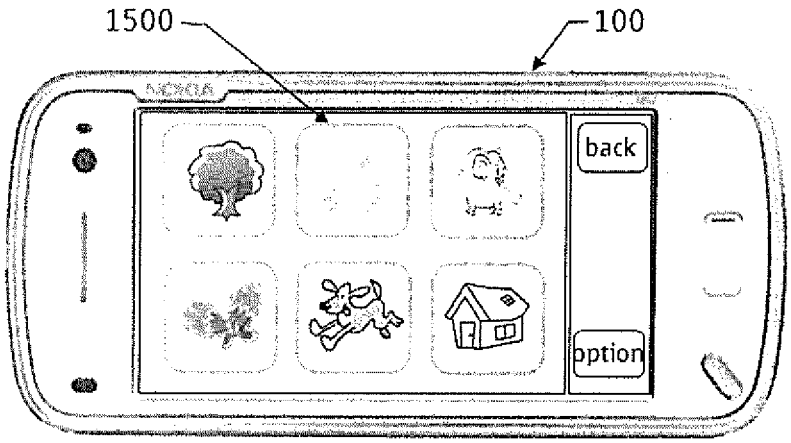
Figure 15B:
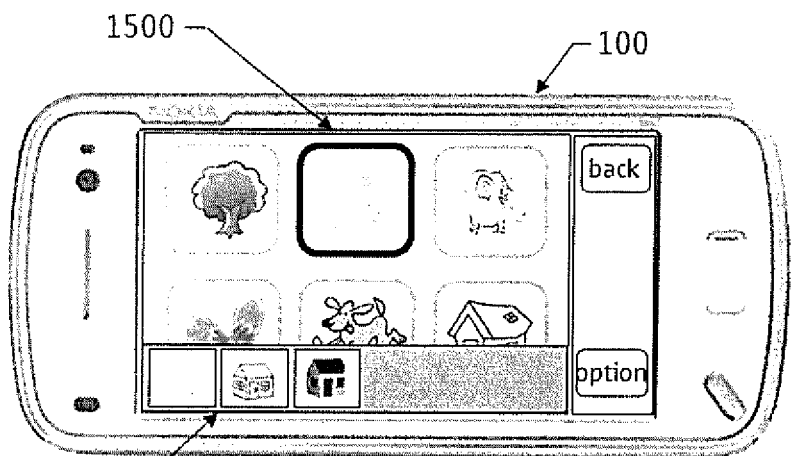
Figure 15C:
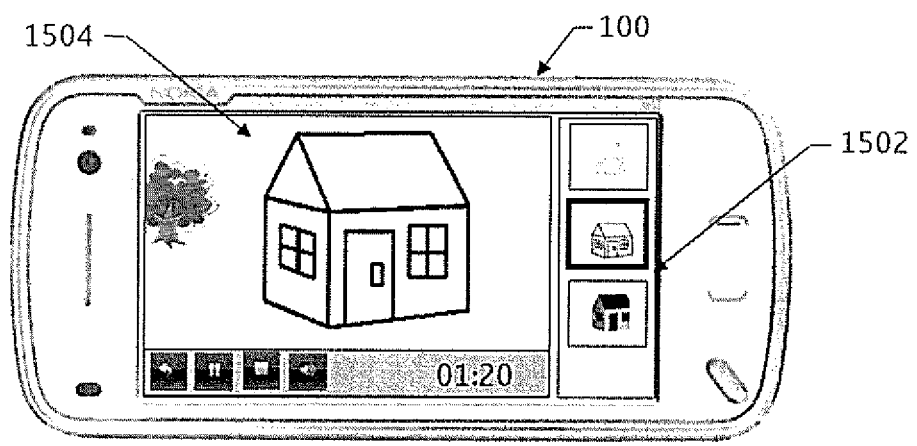

FIG. 15 (including FIGS. 15*a*, 15*b* and 15*c*) illustrates a sequence of displays that may be presented by the apparatus 100 in accordance with example embodiments of the present invention, the displays illustrating aspects of browsing of key frames and groups of key frames of segments of one or more video sequences. As shown in FIG. 15*a*, the apparatus may present a display including thumbnails 1500 of key frames of one or more segments of one or more video sequences. The apparatus may present all of the key frames of the video sequence(s), or in one example in which one or more pluralities of key frames are grouped together, the apparatus may present fewer than all of the key frames of each of one or more of the groups. Similarly, in instances including multiple video sequences, the apparatus may present all of the key frames of the sequences, or in one example, the apparatus may present at least one but fewer than all of the key frames of each of one or more of the sequences.

The user may select one of the key frames in the thumbnail display 1500. As shown in FIG. 15*b*, in response to user selection of one of the key frames, the apparatus may present a second, sub-display display 1502 including the selected key frame and any key frames associated with it, such as in an overlay to the thumbnail display 1500. The associated key frames may in various instances be key frames of the same sequence, segment or group.

In a manner similar to the user selecting one of the key frames in the thumbnail display 1500, the user may select one of the key frames in the sub-display 1502. In response, the apparatus may begin displaying the video sequence 1504 including the selected key frame, beginning from the point of the selected key frame, as shown in FIG. 15*c*. If so desired, the apparatus may maintain the sub-display of key frames, but in one example, may move the sub-display to a different position, as also shown in FIG. 15*c*.

According to one aspect of the example embodiments of present invention, functions performed by the processing apparatus 104, apparatus 200 and/or apparatus 300, such as those illustrated by the flowcharts of FIGS. 4, 6-8 and 11, may be performed by various means. It will be understood that each block or operation of the flowcharts, and/or combinations of blocks or operations in the flowcharts, can be implemented by various means. Means for implementing the blocks or operations of the flowcharts, combinations of the blocks or operations in the flowcharts, or other functionality of example embodiments of the present invention described herein may include hardware, alone or under direction of one or more computer program code instructions, program instructions or executable computer-readable program code instructions from a computer-readable storage medium. In this regard, program code instructions may be stored on a memory device, such as the memory device 204 of the example apparatus, and executed by a processor, such as the processor 202 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowcharts by a processor, or storage of instructions associated with the blocks or operations of the flowcharts in a computer-readable storage medium, supports combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code,
the at least one memory and the computer program code configured to, with the at least one processor, cause the apparatus to at least:
receive a video sequence of a plurality of frames; and as each of at least some of the frames is received but before all of the frames are received,
calculate a score for the frame as a function of a value of each of one or more properties of a picture of the frame;
compare the score for the frame to a predefined threshold; and
cause output of the frame as a key frame in an instance in which the frame is received within a specified period of time and the score for the frame is above the predefined threshold; or otherwise,
cause output of one of the frames received within the specified period of time as a key frame in an instance in which none of the scores for frames received within the specified period of time is above the predefined threshold, the respective one of the frames being the frame having the highest score among the frames received within the specified period of time,
wherein as each frame is received subsequent to the output of the key frame, the memory and computer program code are further configured to, with the at least one processor, cause the apparatus to:
calculate the score for the frame;
compare a weighted score for the frame to the score for the key frame, the weighted score comprising the score for the frame weighted by a weight coefficient; and
cause updating of the key frame with the frame in an instance in which the weighted score for the frame is greater than the score for the key frame.

2. The apparatus of claim 1, wherein the one or more properties include one or more of a luminance, edge point detection, grayscale entropy or color entropy of a picture of the frame.

3. The apparatus of claim 1, wherein the at least one memory and the computer program code are further configured to, with the at least one processor, cause the apparatus to further:
receive user input to select a received frame of the video sequence as a key frame, the user input being received before all of the frames of the video sequence are received; and in response thereto,
cause output of one of the received frames as a key frame.

4. The apparatus of claim 3, wherein being configured to cause the apparatus to cause output of one of the received frames includes being configured to cause the apparatus to cause output of one of the received frames having a highest score among a plurality of the received frames.

5. The apparatus of claim 1, wherein the video sequence includes at least one of a long segment or a plurality of segments, each of which includes a plurality of frames, wherein a long segment comprises a segment comprising a number of frames satisfying a threshold number of frames, and
wherein the at least one memory and the computer program code are configured to, with the at least one processor, cause the apparatus to calculate a score, compare the score, and cause output of the frame as a key frame in an instance in which the score for the frame is above the predefined threshold or cause output of one of the frames received within a specified period of time in a plurality of instances for the long segment, or for each of at least some of the segments of the video sequence.

6. The apparatus of claim 5, wherein the at least one memory and the computer program code are further configured to, with the at least one processor and as at least some but before all of the frames of the video sequence are received, cause the apparatus to further detect at least some of the segments, including:
    calculate an inter-frame difference between pictures of one or more successive pairs of frames, the inter-frame difference being calculated as a function of values of each of one or more second properties of the pictures of the respective frames; and
    identify a pair of frames as a boundary between segments to thereby detect an end of one segment and a beginning of a next segment in an instance in which the inter-frame difference is above a second threshold.

7. The apparatus of claim 6, wherein being configured to cause the apparatus to identify a pair of frames as a boundary between segments includes being configured to cause the apparatus to:
    identify a pair of frames as a potential boundary between segments in an instance in which the inter-frame difference is above the second threshold;
    calculate motion information for at least one of the identified pair of frames or one or more successive pairs of frames after the identified pair of frames; and
    identify the pair of frames as an actual boundary between segments in an instance in which the pair of frames satisfy one or more conditions, at least one of which is a function of the motion information.

8. The apparatus of claim 5, wherein the at least one memory and the computer program code are further configured to, with the at least one processor, cause the apparatus to further:
    group at least one plurality of frames output as key frames based on an identification of at least two of the frames in each plurality being similar, the respective frames being identified as being similar based on values of one or more second properties of pictures of the respective frames satisfying a difference threshold.

9. The apparatus of claim 8, wherein the one or more second properties include one or more of a block histogram, color histogram or order sequence.

10. A method comprising:
    receiving a video sequence of a plurality of frames; and as each of at least some of the frames is received but before all of the frames are received,
    calculating a score for the frame as a function of a value of each of one or more properties of a picture of the frame;
    comparing the score for the frame to a predefined threshold; and
    causing output of the frame as a key frame in an instance in which the frame is received within a specified period of time and the score for the frame is above the predefined threshold; or otherwise,
    causing output of one of the frames received within the specified period of time as a key frame in an instance in which none of the scores for frames received within the specified period of time is above the predefined threshold, the respective one of the frames being the frame having the highest score among the frames received within the specified period of time,
    wherein as each of at least some of the frames is received after output of the key frame, the method further comprises:
    calculating the score for the frame;
    comparing a weighted score for the frame to the score for the key frame, the weighted score comprising the score for the frame weighted by a weight coefficient; and
    causing updating of the key frame with the frame in an instance in which the weighted score for the frame is greater than the score for the key frame.

11. The method of claim 10, wherein the one or more properties include one or more of a luminance, edge point detection, grayscale entropy or color entropy of a picture of the frame.

12. The method of claim 10 further comprising:
    receiving user input to select a received frame of the video sequence as a key frame, the user input being received before all of the frames of the video sequence are received; and in response thereto,
    causing output of one of the received frames as a key frame.

13. The method of claim 12, wherein causing output of one of the received frames includes causing output of one of the received frames having a highest score among a plurality of the received frames.

14. The method of claim 10, wherein the video sequence includes at least one of a long segment or a plurality of segments, each of which includes a plurality of frames, wherein a long segment comprises a segment comprising a number of frames satisfying a threshold number of frames, and
    wherein calculating a score, comparing the score, and causing output of the frame as a key frame in an instance in which the score for the frame is above the predefined threshold or causing output of one of the frames received within a specified period of time occur in a plurality of instances for the long segment, or for each of at least some of the segments of the video sequence.

15. The method of claim 14, wherein as at least some but before all of the frames of the video sequence are received, the method further comprises detecting at least some of the segments, including:
    calculating an inter-frame difference between pictures of one or more successive pairs of frames, the inter-frame difference being calculated as a function of values of each of one or more second properties of the pictures of the respective frames; and
    identifying a pair of frames as a boundary between segments to thereby detect an end of one segment and a beginning of a next segment in an instance in which the inter-frame difference is above a second threshold.

16. The method of claim 15, wherein identifying a pair of frames as a boundary between segments includes:
    identifying a pair of frames as a potential boundary between segments in an instance in which the inter-frame difference is above the second threshold;
    calculating motion information for at least one of the identified pair of frames or one or more successive pairs of frames after the identified pair of frames; and
    identifying the pair of frames as an actual boundary between segments in an instance in which the pair of frames satisfy one or more conditions, at least one of which is a function of the motion information.

17. A non-transitory computer-readable storage medium having computer-readable program code portions stored therein, the computer-readable storage medium and computer-readable program code portions being configured to, with at least one processor, cause an apparatus to at least:
    receive a video sequence of a plurality of frames; and as each of at least some of the frames is received but before all of the frames are received,
    calculate a score for the frame as a function of a value of each of one or more properties of a picture of the frame;
    compare the score for the frame to a predefined threshold; and cause output of the frame as a key frame in an instance in which the frame is received within a specified period of time and the score for the frame is above the predefined threshold; or otherwise, cause output of one of the frames received within the specified period of time as a key frame in an instance in which none of the scores for frames received within the specified period of time is above the predefined threshold, the respective one of the frames being the frame having the highest score among the frames received within the specified period of time;

wherein as each frame is received subsequent to the output of the key frame, the computer-readable storage medium and computer-readable program code portions are further configured to, with at least one processor, cause an apparatus to:

calculate the score for the frame;

compare a weighted score for the frame to the score for the key frame, the weighted score comprising the score for the frame weighted by a weight coefficient; and cause updating of the key frame with the frame in an instance in which the weighted score for the frame is greater than the score for the key frame.

18. The computer-readable storage medium of claim 17, wherein the one or more properties include one or more of a luminance, edge point detection, grayscale entropy or color entropy of a picture of the frame.

\* \* \* \* \*